(12) United States Patent
Smith

(10) Patent No.: US 10,485,167 B2
(45) Date of Patent: Nov. 26, 2019

(54) CONTROL ASSEMBLY FOR A WALK-BEHIND MOWER

(71) Applicant: MTD PRODUCTS INC, Valley City, OH (US)

(72) Inventor: Philip B. Smith, Vermilion, OH (US)

(73) Assignee: MTD Products Inc, Valley City, OH (US)

(*) Notice: Subject to any disclaimer, the term of this patent is extended or adjusted under 35 U.S.C. 154(b) by 126 days.

(21) Appl. No.: 15/711,408

(22) Filed: Sep. 21, 2017

(65) Prior Publication Data

US 2018/0077862 A1 Mar. 22, 2018

Related U.S. Application Data

(60) Provisional application No. 62/397,659, filed on Sep. 21, 2016.

(51) Int. Cl.
| | | |
|---|---|---|
| *A01D 69/06* | (2006.01) | |
| *A01D 34/68* | (2006.01) | |
| *A01D 34/82* | (2006.01) | |
| *A01D 101/00* | (2006.01) | |

(52) U.S. Cl.
CPC ........ *A01D 34/6806* (2013.01); *A01D 34/824* (2013.01); *A01D 2034/6825* (2013.01); *A01D 2034/6843* (2013.01); *A01D 2101/00* (2013.01)

(58) Field of Classification Search
CPC ........ F16H 59/0278; F16H 59/04; F16H 7/02; F16H 7/0827; F16H 9/12; B60K 17/354; B60K 17/356; B60K 23/08; A01D 34/69; A01D 2034/6843; A01D 2101/00; A01D 34/6806; A01D 34/824; A01D 2034/6825
See application file for complete search history.

(56) References Cited

U.S. PATENT DOCUMENTS

| | | |
|---|---|---|
| 4,610,174 A | 9/1986 | Takagi |
| 4,771,852 A | 9/1988 | Nishikawa |
| 5,511,631 A | 4/1996 | Tsuchihashi |
| 6,082,083 A | 7/2000 | Stalpes |
| 6,363,630 B1 | 4/2002 | Ziegler |

(Continued)

FOREIGN PATENT DOCUMENTS

| | | |
|---|---|---|
| WO | 2000071378 | 11/2000 |
| WO | 2004014119 | 2/2004 |

(Continued)

*Primary Examiner* — Arpad Fabian-Kovacs
(74) *Attorney, Agent, or Firm* — Wegman Hessler

(57) ABSTRACT

A control assembly for controlling the mode of all-wheel-drive walk-behind mower is provided. The control assembly includes a casing and a pair of levers extending from opposing lateral sides of the casing, wherein both of the levers are rotatable between a first operative position and a second operative position relative to the casing. Rotating both of the levers to the second operative position switches the control assembly to an all-wheel-drive mode in which a front transmission and a rear transmission are both in an engaged state resulting in the front and rear wheels of the lawn mower to be rotated by the transmissions. When both levers are in the second operative position, the levers are releasably attached to each other and can be maintained in the second operative position by the user continually grasping only one of the levers.

17 Claims, 21 Drawing Sheets

(56) References Cited

U.S. PATENT DOCUMENTS

| | | | |
|---|---|---|---|
| 6,425,452 | B1 | 7/2002 | Steiner |
| 7,162,853 | B2 | 1/2007 | Nagai |
| 7,416,040 | B2 | 8/2008 | Dvorak |
| 7,597,160 | B2 | 10/2009 | Lawson, Jr. |
| 7,770,485 | B2 | 8/2010 | Suzuki |
| 8,312,946 | B2 | 11/2012 | Lahey |
| 8,708,074 | B1 | 4/2014 | McCoy |
| 9,055,713 | B2 | 5/2015 | Helgesen |
| 9,163,707 | B2 * | 10/2015 | Helin .................. A01D 34/6806 |
| 9,538,699 | B1 * | 1/2017 | Bejcek ................. A01D 34/006 |
| 9,677,648 | B2 * | 6/2017 | Wadzinski ............ F16H 7/0827 |
| 2003/0182919 | A1 | 10/2003 | Baumann |
| 2004/0074686 | A1 * | 4/2004 | Abend ................... A01D 34/63 180/242 |
| 2004/0104056 | A1 * | 6/2004 | Perlick ................. B60K 17/346 180/6.2 |
| 2004/0268424 | A1 | 12/2004 | Phelps |
| 2011/0000175 | A1 | 1/2011 | Lahey |
| 2015/0113932 | A1 | 4/2015 | Helgesen |

FOREIGN PATENT DOCUMENTS

| | | |
|---|---|---|
| WO | 2008027320 | 3/2008 |
| WO | 2009000344 | 12/2008 |
| WO | 2013122563 | 8/2013 |

* cited by examiner

CONTROL ASSEMBLY FOR A WALK-BEHIND MOWER

CROSS-REFERENCE TO RELATED APPLICATIONS

This application claims priority to U.S. Provisional Patent Application Ser. No. 62/397,659 filed Sep. 21, 2016, and entitled CONTROL ASSEMBLY FOR A WALK-BEHIND MOWER, which is herein incorporated by reference in its entirety.

FIELD OF THE INVENTION

The present invention relates to walk-behind lawn mowers, and more particularly, to an all-wheel drive self-propelled lawn mower.

BACKGROUND OF THE INVENTION

The propulsion of walk-behind lawn mowers has historically been operator-powered which required the operator to push the lawn mower around the yard. More recent walk-behind mowers have added self-propelled technology that typically includes a transmission that is powered by the primary engine, wherein the transmission is operatively connected to a pair of opposing wheels of the lawn mower to provide rotational power to those wheels so as to drive the mower. Generally, the self-propelled transmission is a single-speed transmission that is either engaged/on or disengaged/off. These single-speed self-propelled transmissions are typically controlled by an on/off switch or lever positioned on or near the cross-bar of the handle. These switches or levers may include, for example, a fore-aft adjustable lever on one leg of the handle, a rotatable bale that may operate independently or in conjunction with the safety bale, or a trigger-like mechanism, wherein actuation of the switches or levers causes the transmission to become engaged such that the transmission powers the wheels of the lawn mower.

These single-speed self-propelled transmission for a walk-behind mower are often difficult to effectively use by an operator for several reasons. For example, the speed generated by the transmission to the wheels may cause the lawn mower to travel at a speed that can be too fast or too slow for the operator. As such, if the propelled speed is too slow, the operator ends up providing the pushing force. On the other hand, if the propelled speed is too fast, the operator ends up being dragged along by the lawn mower. In either situation, transmission often cannot be optimized for each individual operator. Alternatively, when an operator approaches an object such as a tree, house, sidewalk, posts, or the like, the operator often desires to slow down to make turns or navigate the lawn mower around these obstacles, but the self-propelled transmission being engaged causes the lawn mower to proceed at the same speed which can make avoiding obstacles more difficult.

BRIEF SUMMARY OF THE INVENTION

In one aspect of the present invention a control assembly for controlling a drive mode of a walk-behind lawn mower is provided. The control assembly includes a casing attached to a handle assembly. A first lever is operatively connected to the casing and extending from a lateral side of the casing. The first lever is rotatable between a first operative position and a second operative position relative to the casing. A second lever is operatively connected to the casing and extending from an opposing lateral side of the casing than the first lever. The first lever is rotatable between a first operative position and a second operative position relative to the casing. A front transmission is operatively connected to the first lever and a pair of front wheels, wherein rotation of the first lever from the first operative position to the second operative position causes the front transmission to be switched from a disengaged state to an engaged state, the front wheels being driven by the front transmission when the front transmission is switched from the disengaged state to the engaged state. A rear transmission operatively connected to the second lever and a pair of rear wheels, wherein rotation of the second lever from the first operative position to the second operative position causes the rear transmission to be switched from a disengaged state to an engaged state, the rear wheels being driven by the rear transmission when the rear transmission is switched from the disengaged state to the engaged state. Actuation of both the first lever and the second from the first operative position to the second operative position produces an all-wheel-drive mode in which the front wheels are driven by the front transmission and the rear wheels are driven by the rear transmission. The all-wheel-drive mode is maintained by continuously actuating only one of the first lever or the second lever in the second operative position In another aspect of the present invention, control assembly for controlling a drive mode of a walk-behind lawn mower is provided. The control assembly includes a casing attached to a handle assembly. The casing is formed of an upper housing and a lower housing. A first lever is operatively connected to the casing and extends outwardly from a lateral side of the casing. The first lever is rotatable between a first operative position and a second operative position relative to the casing. A second lever is operatively connected to the casing and extends outwardly from an opposing lateral side of the casing than the first lever. The first lever is rotatable between a first operative position and a second operative position relative to the casing. A plurality of transmissions are operatively connected to the first and second levers. The plurality of transmissions are operatively connected to the front wheels and the rear wheels. Actuation of both the first lever and the second from the first operative position to the second operative position produces an all-wheel-drive mode in which the front wheels and rear wheels are driven by at least two of the transmissions.

In still another aspect of the present invention, a control assembly for controlling a drive mode of a walk-behind lawn mower is provided. The control assembly includes a casing attached to a handle assembly. The casing is formed of an upper housing and a lower housing. A pair of levers are operatively connected to the casing, wherein two of the levers extend in opposite directions from the casing and the levers are rotatable relative to the casing between a first operative position and a second operative position. A plurality of transmissions are operatively connected to the first and second levers, the plurality of transmissions are operatively connected to front wheels and rear wheels. The plurality of transmissions generate a no-wheel-drive mode, a front-wheel-drive mode, a rear-wheel-drive mode, and an all-wheel-drive mode in response to selective rotation of the first and second levers.

Advantages of the present invention will become more apparent to those skilled in the art from the following description of the embodiments of the invention which have been shown and described by way of illustration. As will be realized, the invention is capable of other and different embodiments, and its details are capable of modification in various respects.

BRIEF DESCRIPTION OF SEVERAL VIEWS OF THE DRAWINGS

These and other features of the present invention, and their advantages, are illustrated specifically in embodiments of the invention now to be described, by way of example, with reference to the accompanying diagrammatic drawings, in which.

Figure 1:
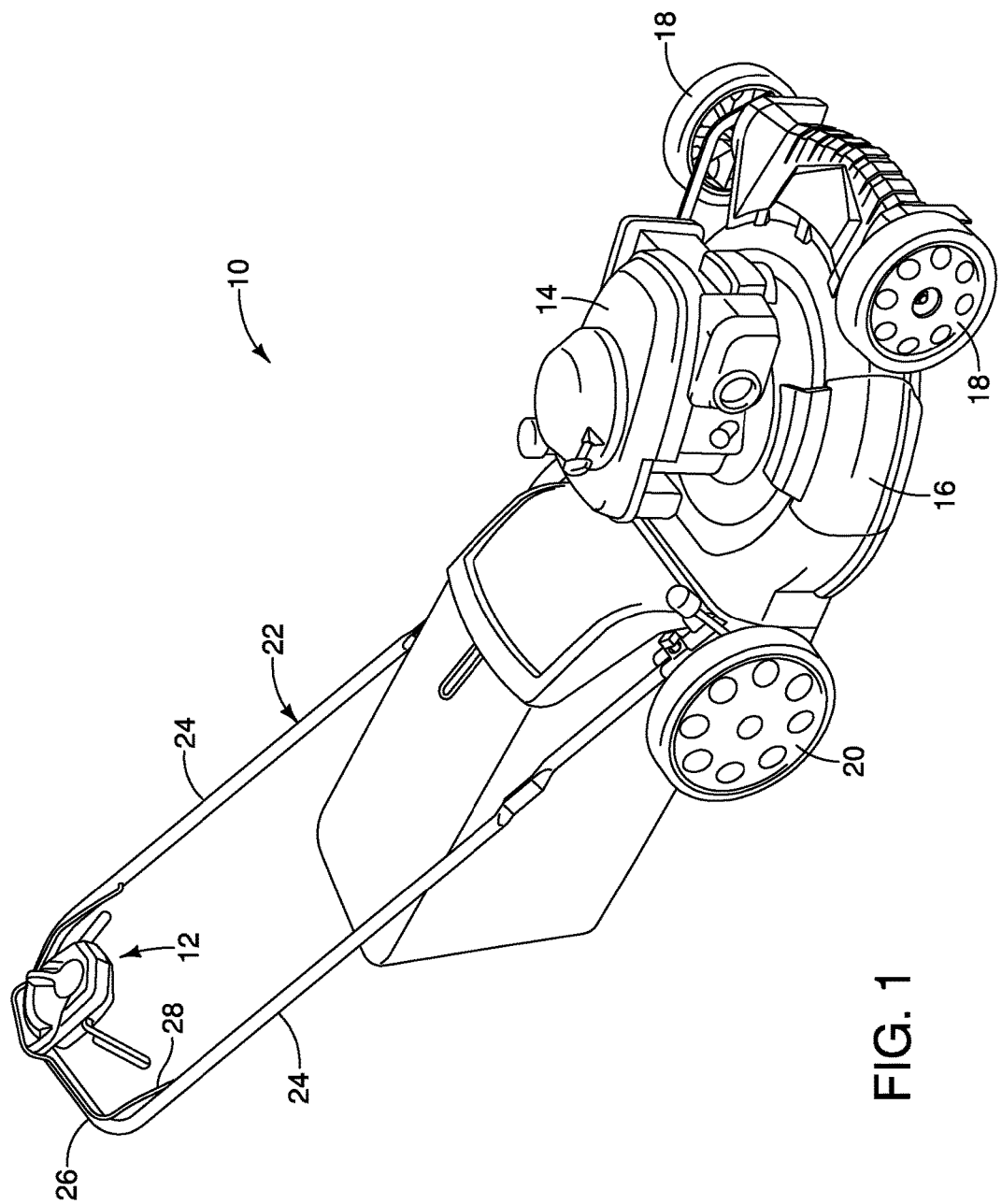
FIG. 1 is an exemplary embodiment of a self-propelled walk-behind lawn mower.

It should be noted that all the drawings are diagrammatic and not drawn to scale. Relative dimensions and proportions of parts of these figures have been shown exaggerated or reduced in size for the sake of clarity and convenience in the drawings. The same reference numbers are generally used to refer to corresponding or similar features in the different embodiments. Accordingly, the drawing(s) and description are to be regarded as illustrative in nature and not as restrictive.

DETAILED DESCRIPTION OF THE PREFERRED EMBODIMENT

Referring to FIG. 1, an exemplary embodiment of a self-propelled walk-behind lawn mower 10 having a control assembly 12 for selectively controlling the self-propulsion of the mower 10 is shown. In the illustrated embodiment, the lawn mower 10 includes a power source 14 that powers a rotating blade assembly (not shown) for cutting grass, and the power source 14 is mounted on a deck 16 or frame that provides a structural base for the lawn mower 10. In the illustrated embodiment, the power source 14 is an internal combustion engine. It should be understood by one having ordinary skill in the art that the power source 14 of the mower 10 can alternatively include an electric motor or a hybrid-electric power source. A pair of front wheels 18 are operatively connected to the deck 16 by way of a front axle, and a pair of rear wheels 20 are operatively connected to the deck 16 by way of a rear axle. The mower 10 further includes a front transmission 200 and a rear transmission 210, wherein the front and rear transmissions 200, 210 are operatively connected to the front and rear wheels 18, 20 for providing selective rotation thereof. The control assembly 12 is configured to independently and selectively switch the front and rear transmissions 200, 210 between an engaged state and a disengaged state, as will be described below.

As shown in FIG. 1, the exemplary embodiment of the mower 10 includes a handle assembly 22 for controlling the direction and movement of the mower 10. The handle assembly 22 includes a pair of generally parallel arms 24 extending from the deck 16 in a spaced-apart manner and a cross bar 26 that extends laterally between the pair of arms 24. It should be understood by one having ordinary skill in the art that other handle assembly 22 designs can be used to control the direction of the mower 10. The mower 10 also includes a safety bale 28 that acts as an operator presence control, wherein the safety bale 28 is actuatable between a disengaged position in which the safety bale 28 is spaced apart from the cross bar 26 and an engaged position in which the safety bale 28 is rotated to a position in contact with or immediately adjacent to the cross bar 26. The safety bale 28 acts to ensure that the engine is stopped when the user releases the safety bale 28. Actuation of the safety bale 28 to the engaged position allows the operator to start the operation of the power source 14, and actuation of the safety bale 28 to the disengaged position turns off the power source 14. The safety bale 28 is biased toward the disengaged position such that releasing the safety bale 28 causes the safety bale 28 to return to the disengaged position. The control assembly 12 is attached to the cross bar 26 and is configured to be actuated in cooperation with but separately from the safety bale 28.

Figure 2A:
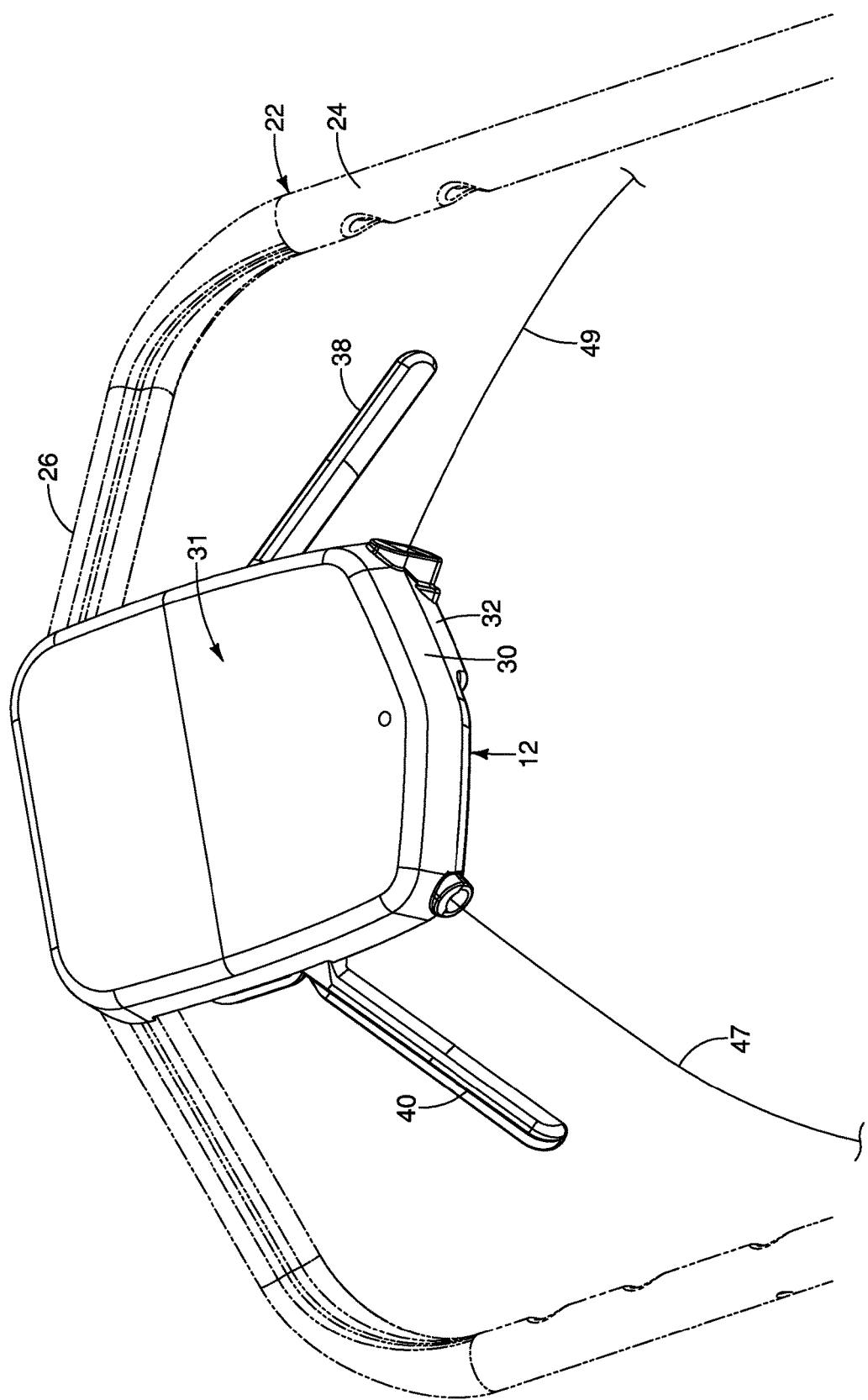
FIG. 2A is a top perspective view of a control assembly in a no-wheel-drive mode.
Figure 2B:
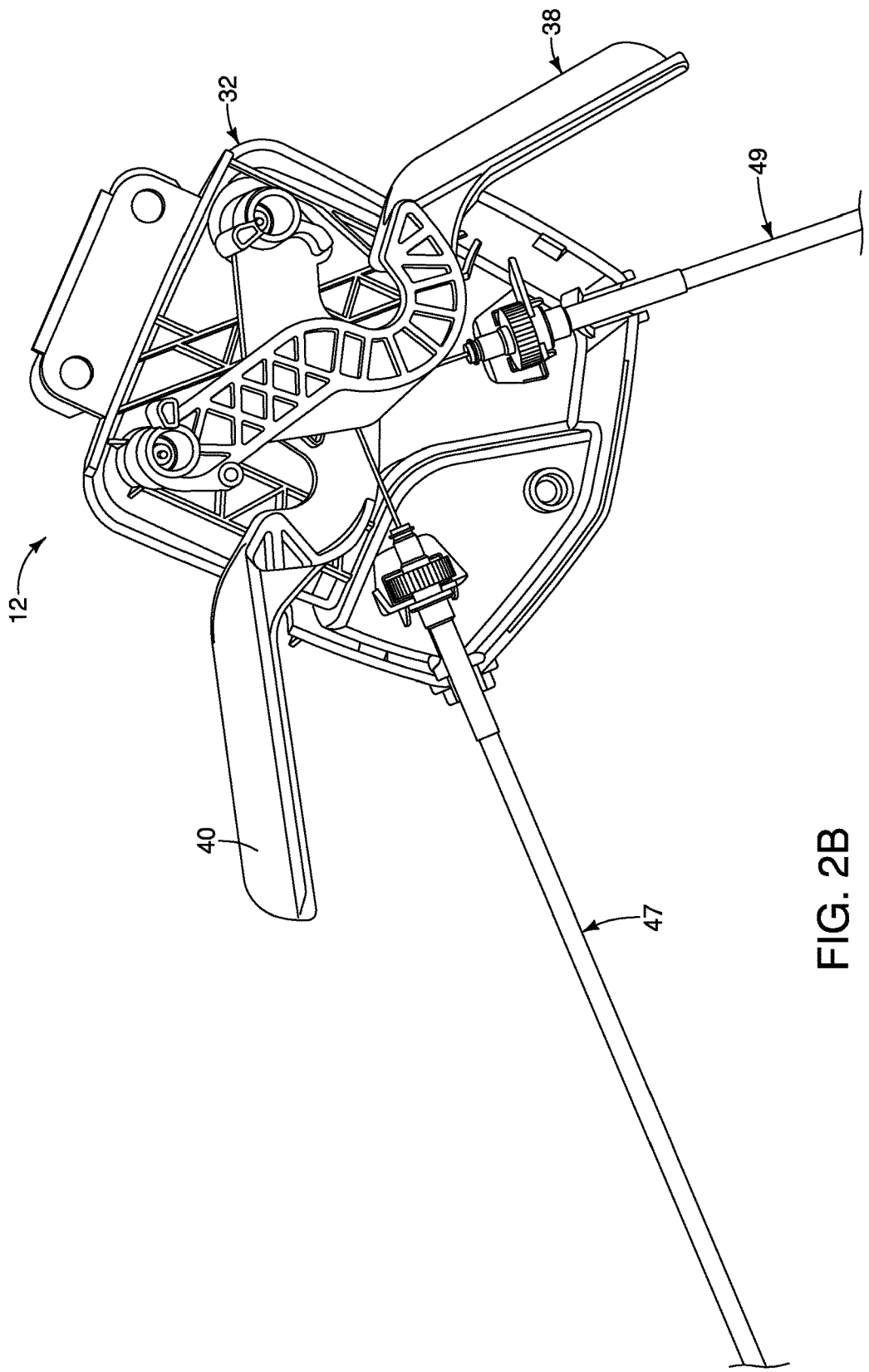
FIG. 2B is a cut-away view of the control assembly in a no-wheel-drive mode, as shown in FIG. 2A.
Figure 3:
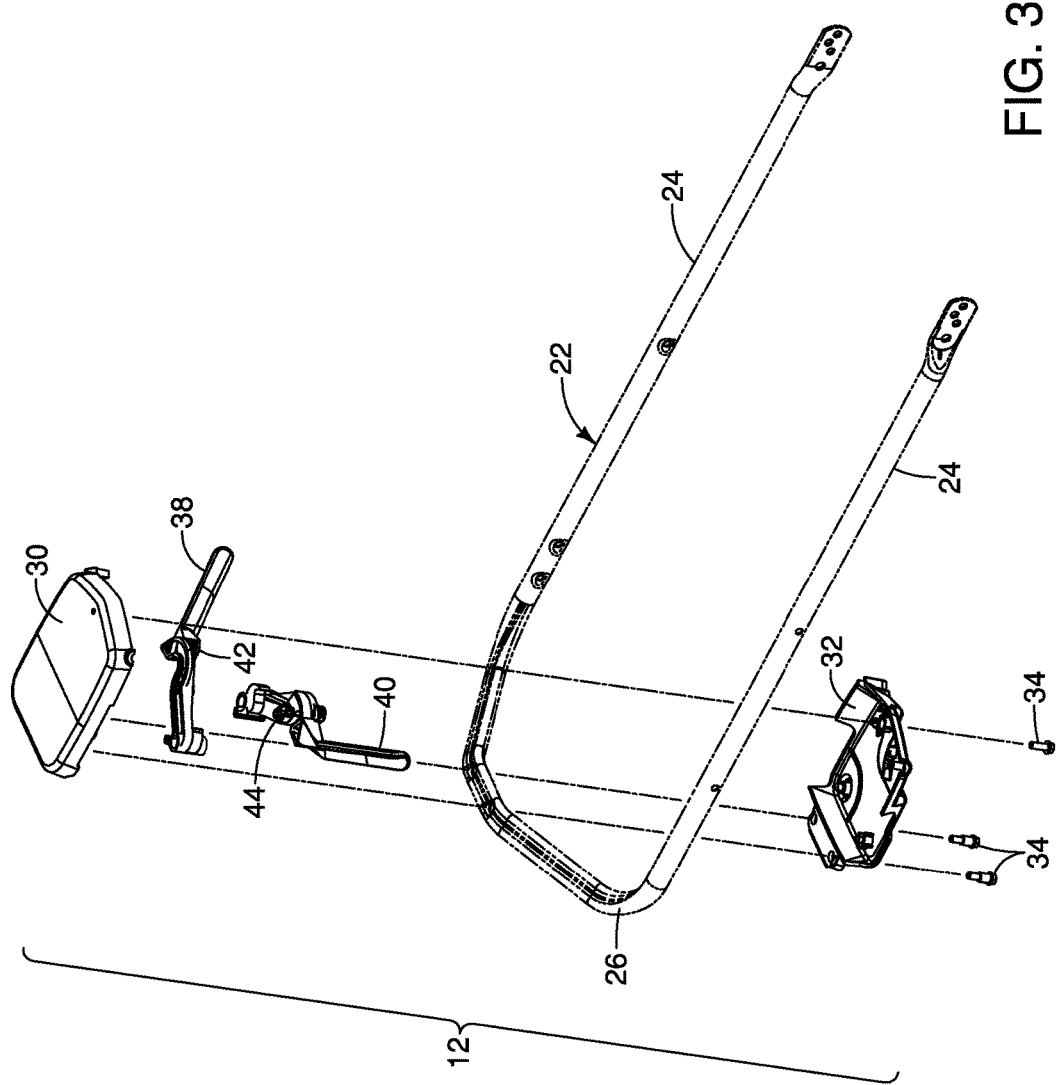
FIG. 3 is an exploded view of an embodiment of the control assembly.

FIGS. 2A-2B and 3 illustrate an exemplary embodiment of the speed control assembly 12. The speed control assembly 12 is operatively connected to the cross bar 24 of the handle 20. In an embodiment, the speed control assembly 12 includes a casing 31 formed of an upper housing 30 and a lower housing 32 attached to the upper housing 30. A portion of the cross bar 26 of the handle assembly 22 is sandwiched between the upper and lower housings 30, 32 when attached together. A plurality of attachment mechanisms 34, such as bolts, screws, or the like, are inserted through apertures or bosses formed in the lower housing 32, passing through holes in the cross bar 26, and received in corresponding apertures or bosses formed in the upper housing 30 to secure the upper and lower housing 30, 32 together while also attaching the entire casing 31 of the speed control assembly 12 to the handle assembly 22. The upper and lower housings 30, 32 are attached to the cross bar 26 in fixed manner such that the casing 31 does not move or rotate relative to the cross bar 26.

Figure 6A:
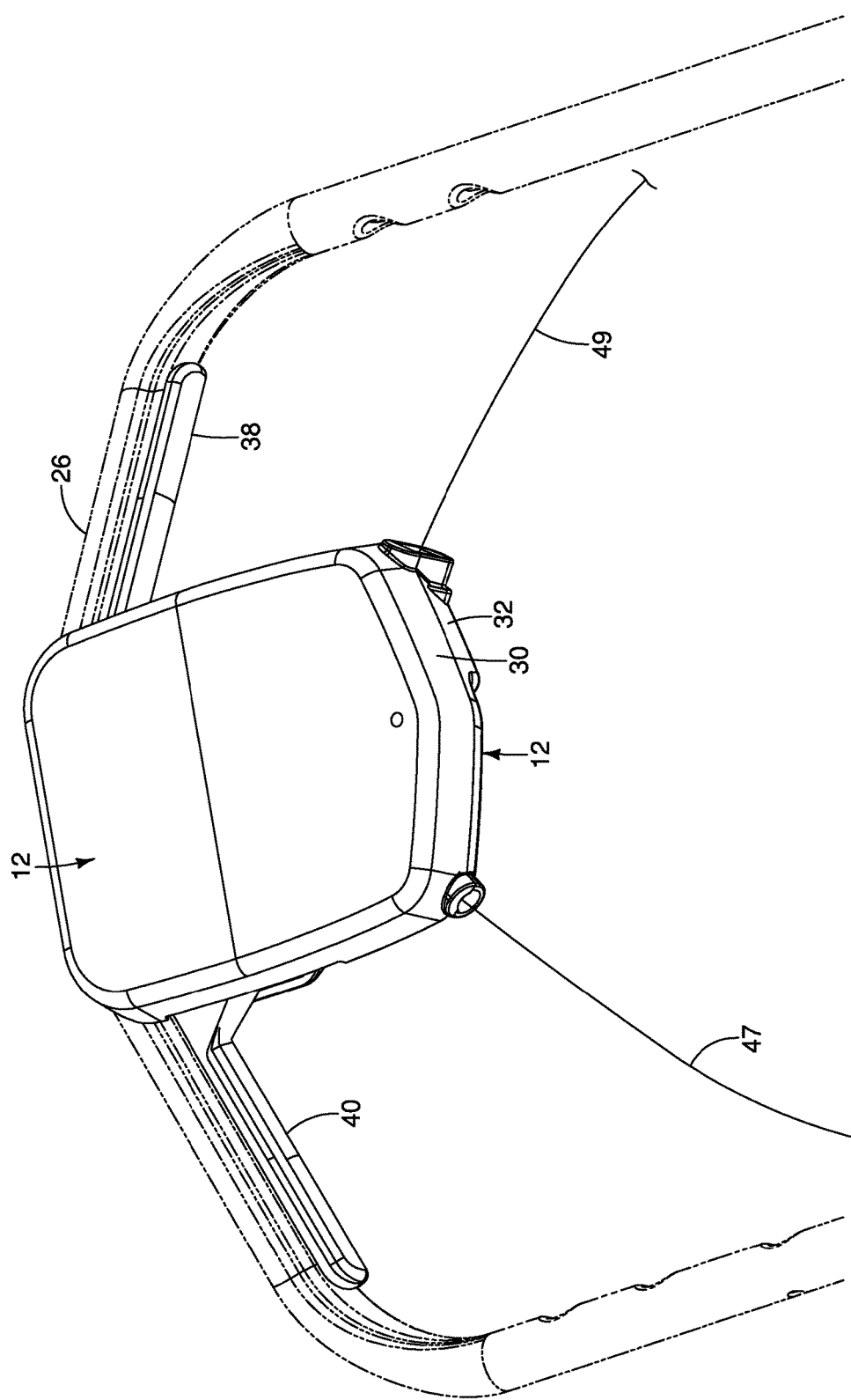
FIG. 6A is a top perspective view of a control assembly in an all-wheel-drive mode.
Figure 6B:
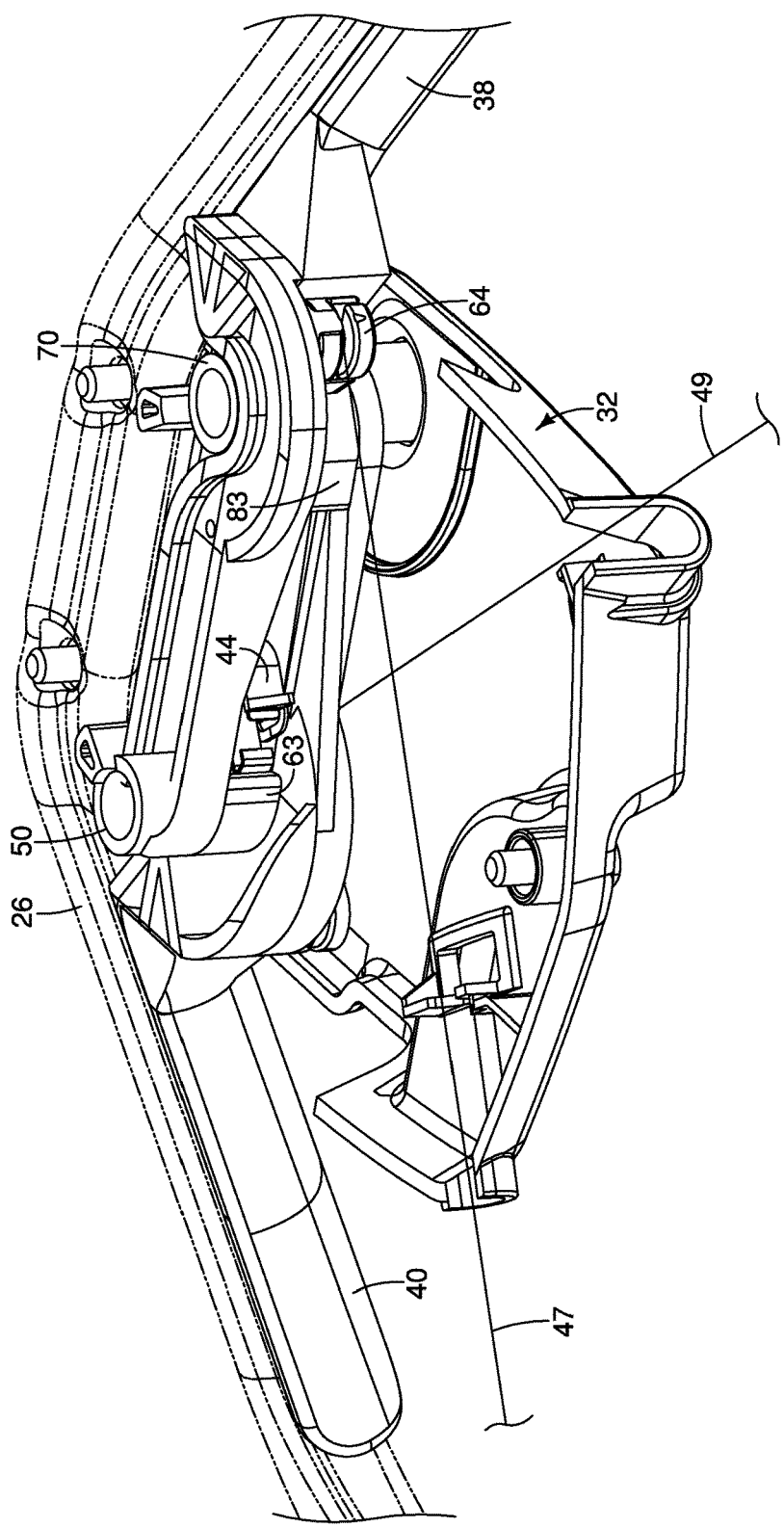
FIG. 6B is a cut-away view of the control assembly in an all-wheel-drive mode, as shown in FIG. 6A.

In an exemplary embodiment, the control assembly 12 includes a first lever 38 and a second lever 40, wherein the first and second levers 38, 40 extend from opposing sides of the casing 31, as shown in FIGS. 2A-2B and 3. One end of each of the first and second levers 38, 40 is rotatably connected to the interior of the casing 31, which allows the opposing end of each of the first and second levers 38, 40 to be rotatable relative to the casing 31. In an embodiment, the first and second levers 38, 40 are biased to a first operative position, as shown in FIG. 2A, wherein the corresponding transmissions are in a disengaged state, as will be described below. The first and second levers 38, 40 are independently and selectively rotatable between the first operative position and a second operative position in which the respective lever is positioned immediately adjacent to the cross bar 26 of the handle assembly 22. FIGS. 6A-6B illustrate an embodiment in which the first and second levers 38, 40 are both rotated to the second operative position such that the first and second levers 38, 40 are positioned immediately adjacent to the cross bar 28 of the handle assembly 22. In an embodiment, the first and second levers 38, 40 are biased toward the first operative position wherein the corresponding front and rear transmissions 200, 210 are in the disengaged state.

As shown in FIG. 3, the control assembly 12 includes an upper housing 30, a lower housing 32, a first lever 38, a first spring latch 42 operatively connected to the first lever 38, a second lever 40, a second latch 44 operatively connected to the second lever 40, and a plurality of attachment mechanisms 34 that operatively connect the upper and lower housings 30, 32 together as well as operatively connect the casing 31 to the cross bar 26 of the handle assembly 22. The first lever 38 is operatively connected to the front transmission 200 (FIG. 11) by way of a first connector 47, wherein actuation of the first lever 38 causes the front transmission 200 to become engaged for providing rotational power to the front wheels 18. The second lever 40 is operatively connected to the rear transmission 210 (FIG. 11) by way of a second connector 49, wherein actuation of the second lever 40 causes the rear transmission 210 to become engaged for providing rotational power to the rear wheels 20. It should be understood by one having ordinary skill in the art that the first lever 38 can alternatively be configured to operate the rear transmission 210 and the second lever 40 can be configured to operate the front transmission 200. In an embodiment, the first and second connectors 47, 49 are formed as Bowden cables.

Figure 4A:
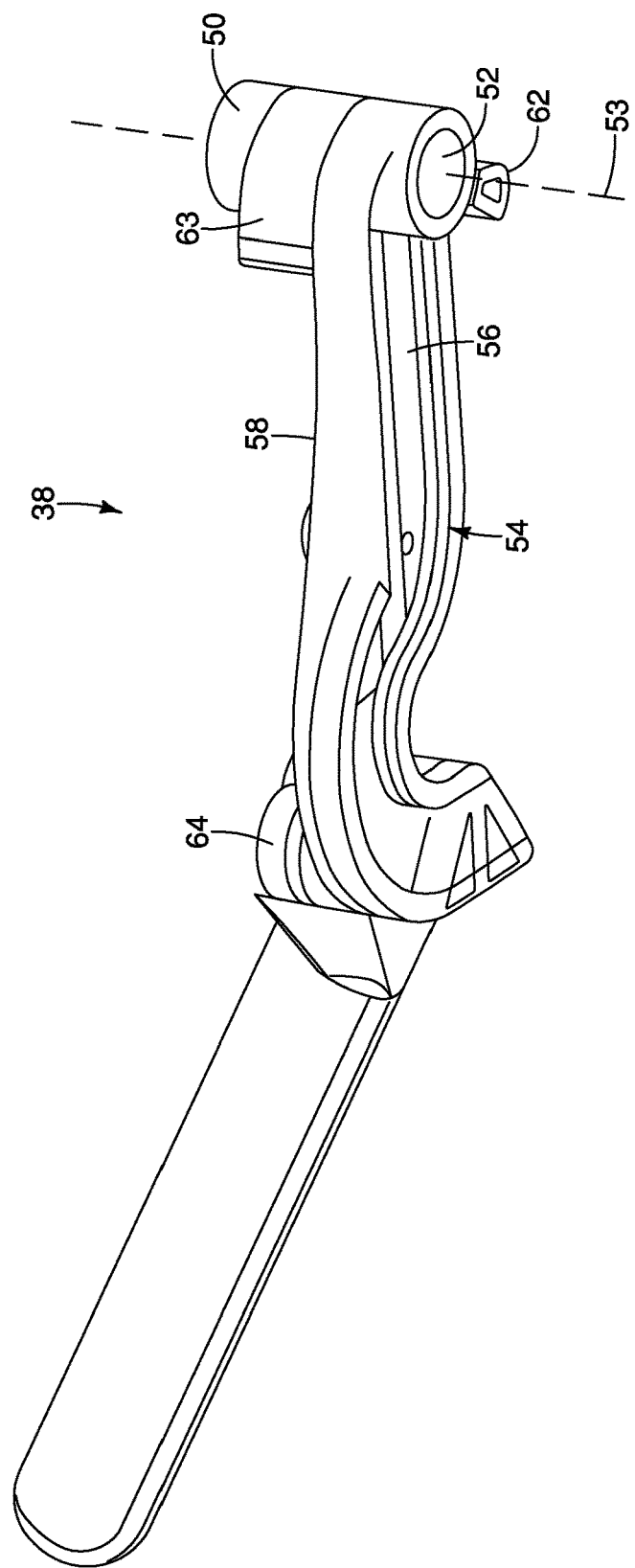
FIG. 4A is a top view of an embodiment of a first lever.
Figure 4B:
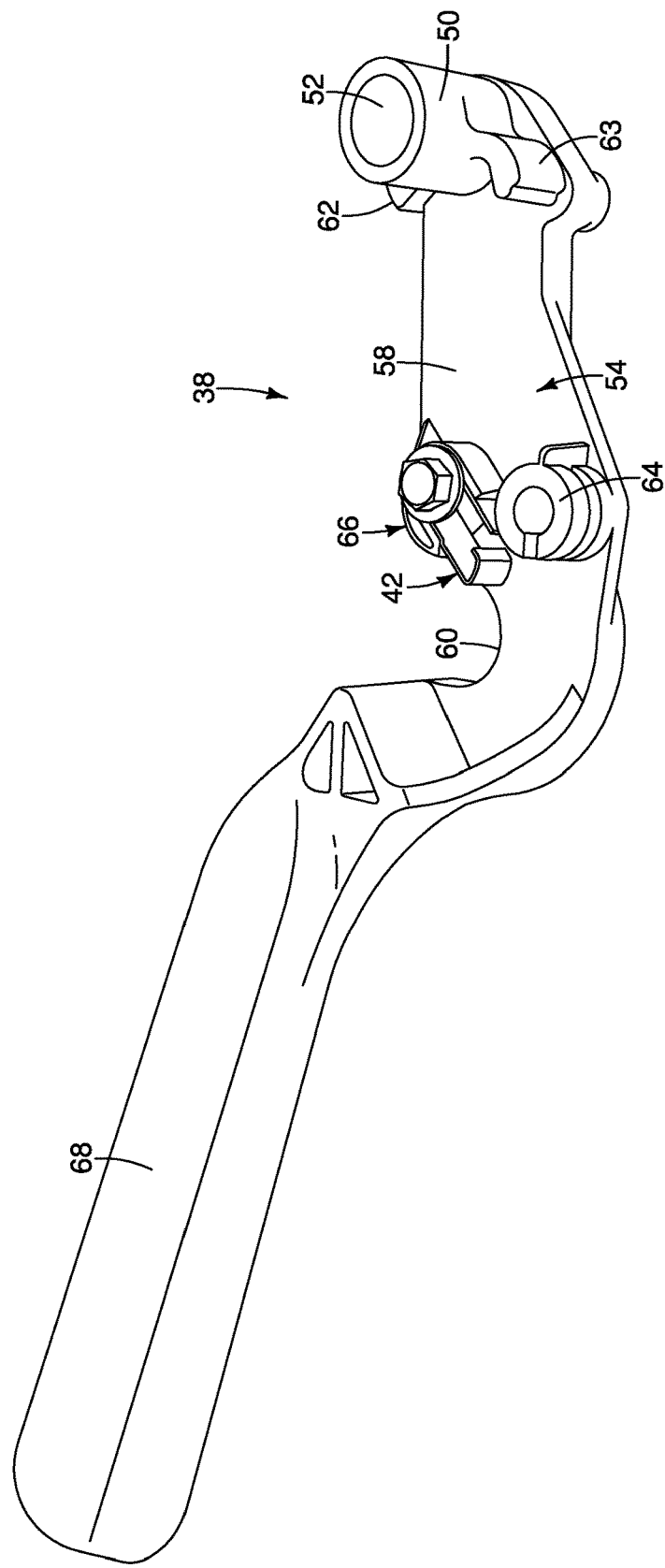
FIG. 4B is a bottom view of the first lever shown in FIG. 4A.

An exemplary embodiment of the first lever 38 and the first spring latch 42 is shown in FIGS. 4A-4B. The first lever 38 includes a first connecting boss 50 positioned at a distal end of the first lever 38. The first connecting boss 50 is a generally cylindrical member defining a first attachment aperture 52 therethrough. The first connecting boss 50 is configured to receive the first attachment mechanisms 112, 130 (FIG. 7B) extending from either the upper and/or lower housing 30, 32 so as to connect the first lever 38 to the casing 31 in a rotatable manner. The first lever 38 is configured to rotate about first longitudinal axis 53 that extends through the first attachment aperture 52. A first central portion 54 extends from the first connecting boss 50 in a transverse manner relative to the first longitudinal axis 53. The first central portion 54 includes an upper surface 56 and an opposing lower surface 58. The first central portion 54 is an elongated, substantially flat member with a first cut-out 60 formed into a side edge of the first central portion 54 adjacent to the end of the first central portion 54 opposite the first connecting boss 50. The first cut-out 60 is configured to allow the first lever 38 to be fully rotated into contact with (or positioned immediately adjacent to) the cross bar 26 of the handle assembly 22 when the first lever 38 is actuated to the second operative position. When in the second operative position, the first cut-out 60 partially surrounds the second connecting boss 70 of the second lever 40.

As shown in FIGS. 4A-4B, the first lever 38 further includes a first biased member 62 that extends from the outer circumferential surface of the first connecting boss 50. The first biased member 62 is substantially aligned with the first longitudinal axis 53 and extends from a location below the lower surface 58 to a location above the upper surface 56. The first biased member 62 is configured to contact a spring 136 integrally formed with the upper housing 30, wherein the first spring 136 biases the first lever 38 toward the first operative position, as will be described in more details below. A first positioning boss 63 extends in a curved manner tangentially away from the first connecting boss 50. The first positioning boss 63 is positioned adjacent to, and integrally formed with, the lower surface 58 of the first central portion 54. The first positioning boss 63 engages the second spring latch 44, as will be described in more detail below. A first cable boss 64 is a cylindrical boss extending from the lower surface 58 of the first central portion 54, wherein one end of the first connector 47 (FIG. 2B) is attached to the first cable boss 64 of the first lever 38. The first lever 38 also includes a first spring boss 66 positioned immediately adjacent to the first cut-out 60 on the central portion 54. The first spring boss 66 extends downwardly from the lower surface 58, and the first spring latch 42 is secured to the first spring boss 66. The grip portion 68 extends from the end of the first central portion 54 opposite the first connecting boss 50. The grip portion 68 has a curvature that corresponds to the shape of the cross bar 26 of the handle assembly 22, which allows the grip portion 68 to abut a portion of the outer rounded surface of the cross bar 26 when the first lever 38 is actuated to the second operative position.

Figure 5A:
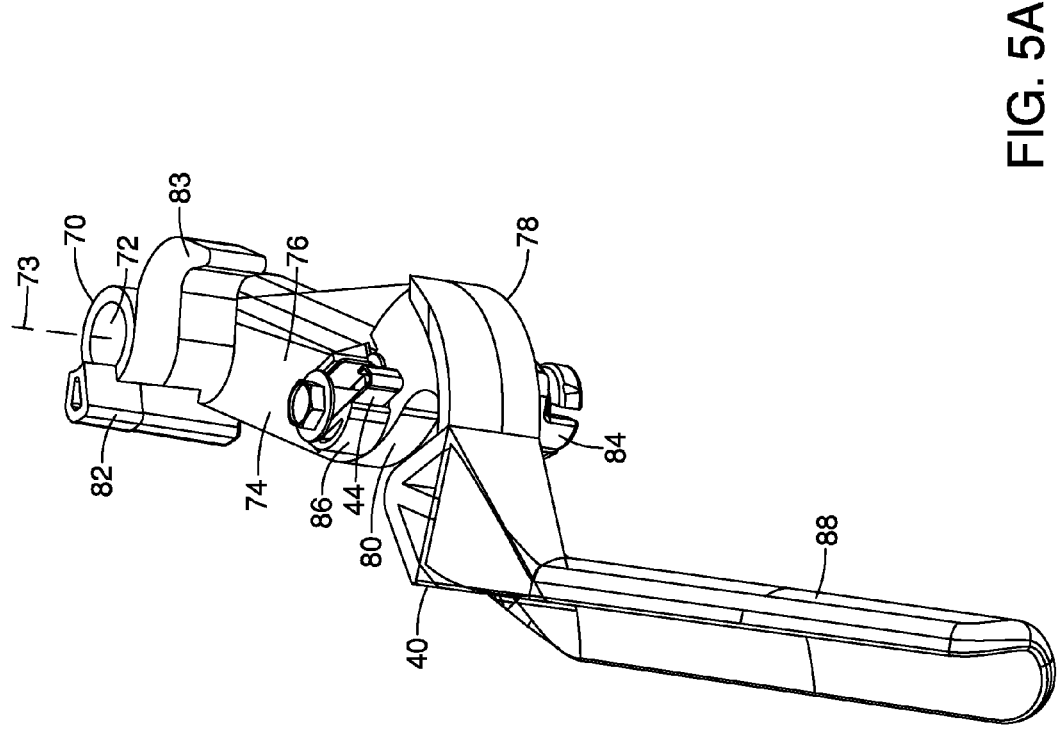
FIG. 5A is a top view of an embodiment of a second lever.
Figure 5B:
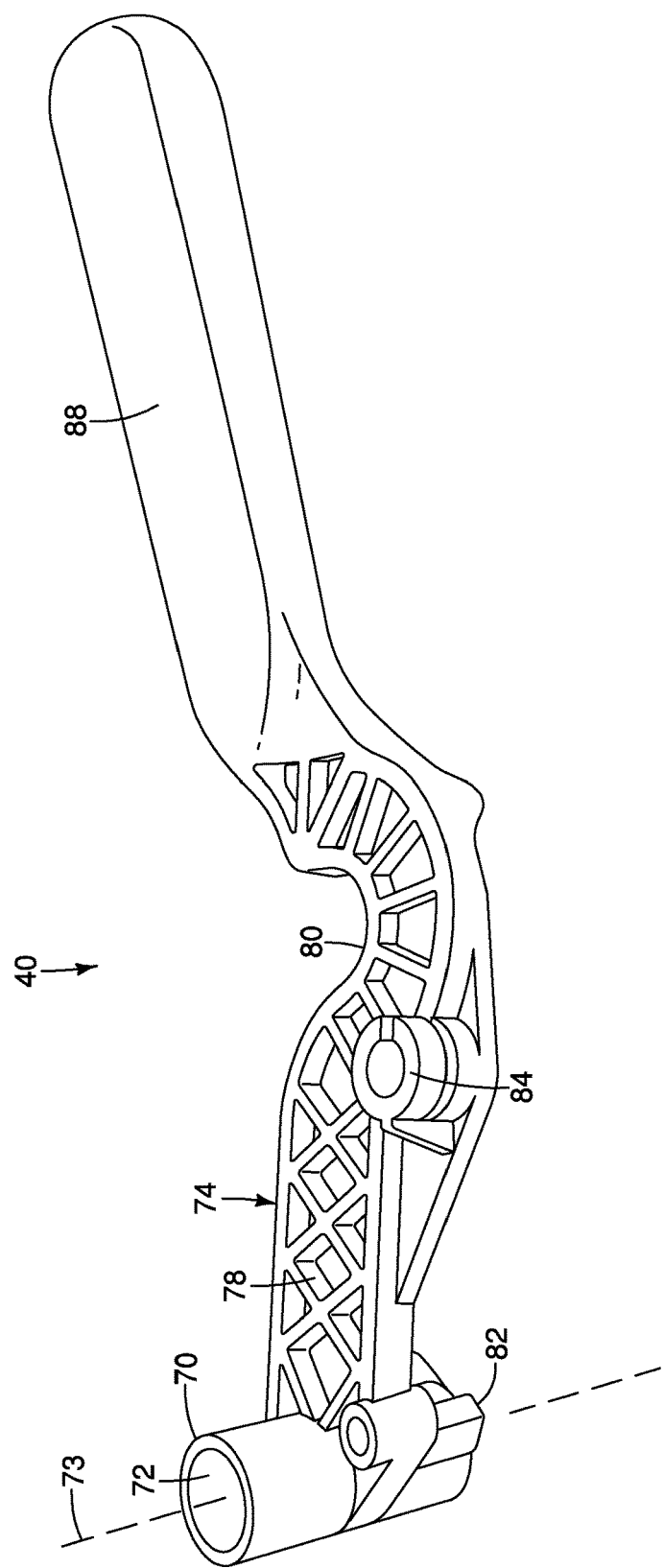
FIG. 5B is a bottom view of the second lever shown in FIG. 5A.
Figure 5C:
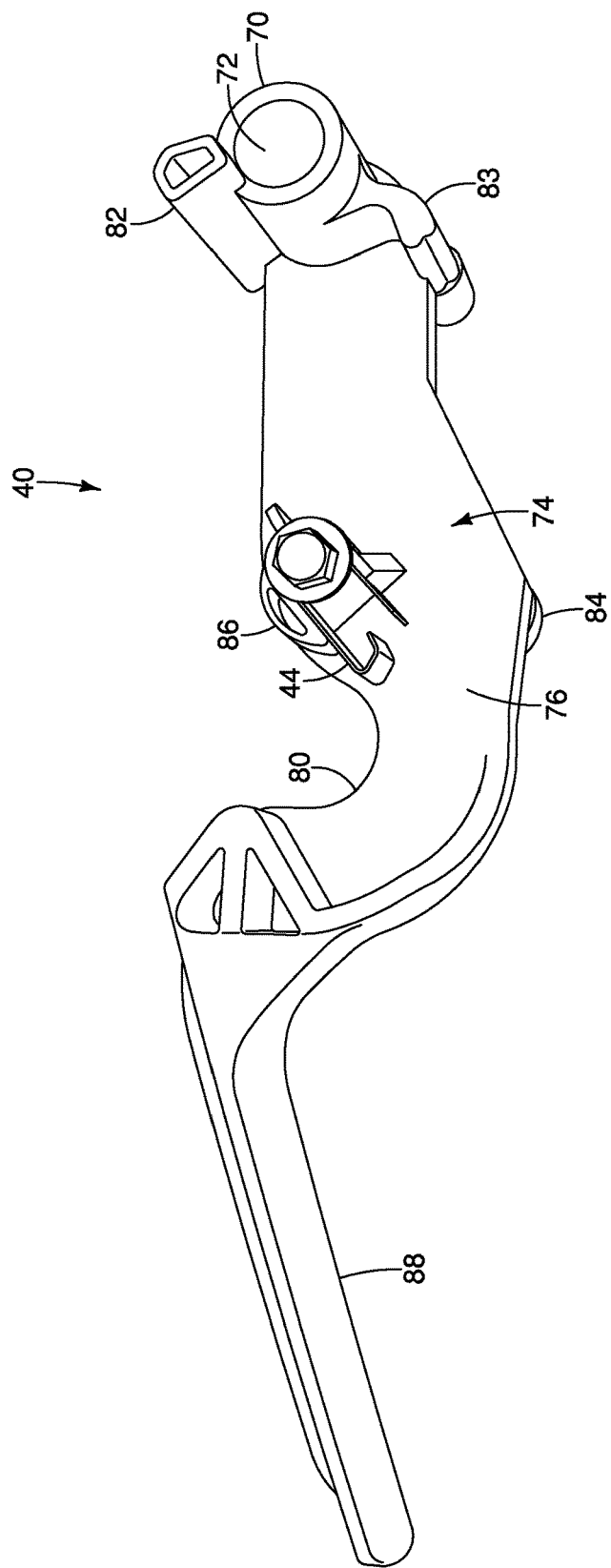
FIG. 5C is a top perspective view of the second lever shown in FIG. 5A.

An exemplary embodiment of the second lever 40 and the second spring latch 44 is shown in FIGS. 5A-5C. The second lever 40 includes a second connecting boss 70 positioned at a distal end of the second lever 40. The second connecting boss 70 is a generally cylindrical member defining a second attachment aperture 72 therethrough. The second connecting boss 70 is configured to receive the second attachment mechanisms 114, 132 (FIG. 7B) extending from either the upper and/or lower housing 30, 32 so as to connect the second lever 40 to the casing 31 in a rotatable manner. The second lever 40 is configured to rotate about second longitudinal axis 73 that extends through the second attachment aperture 72. A second central portion 74 extends from the second connecting boss 70 in a transverse manner relative to the second longitudinal axis 73. The second central portion 74 includes an upper surface 76 and an opposing lower surface 78. The second central portion 74 is an elongated, substantially flat member with a second cut-out 80 formed into a side edge of the second central portion 74 adjacent to the end of the second central portion 74 opposite the second connecting boss 70. The second cut-out 80 is configured to allow the second lever 40 to be fully rotated into contact with (or positioned immediately adjacent to) the cross bar 26 of the handle assembly 22 when the second lever 40 is actuated to the second operative position. When in the second operative position, the second cut-out 80 partially surrounds the first connecting boss 50 of the first lever 30.

As shown in FIGS. 5A-5C, the second lever 40 further includes a second biased member 82 that extends from the outer circumferential surface of the second connecting boss 70. The second biased member 82 is substantially aligned with the second longitudinal axis 73 and extends from a location below the lower surface 78 to a location above the upper surface 76, following along the outer circumferential surface of the second connecting boss 70. The second biased member 82 is configured to contact a spring 136 integrally formed with the upper housing 30, wherein the spring 136 biases the second lever 40 toward the first operative position. A second positioning boss 83 extends in a curved manner tangentially away from the second connecting boss 70. The second positioning boss 83 is positioned adjacent to, and integrally formed with, the upper surface 76 of the second central portion 74. The second positioning boss 83 engages the first spring latch 42, as will be described in more detail below. A second cable boss 84 is a cylindrical boss extending from the lower surface 78 of the second central portion 74, wherein one end of the second connector 49 (FIG. 2B) is attached to the second cable boss 84 of the second lever 40. The second lever 40 also includes a second spring boss 86 positioned immediately adjacent to the second cut-out 80 on the second central portion 74. The second spring boss 86 extends upwardly from the upper surface 76, and the second spring latch 44 is secured to the second spring boss 86. The second grip portion 88 extends from the end of the second central portion 74 opposite the second connecting boss 70. The second grip portion 88 has a curvature that corresponds to the shape of the cross bar 26 of the handle assembly 22, which allows the second grip portion 88 to abut a portion of the outer rounded surface of the cross bar 26 when the second lever 40 is actuated to the second operative position.

Figure 9A:
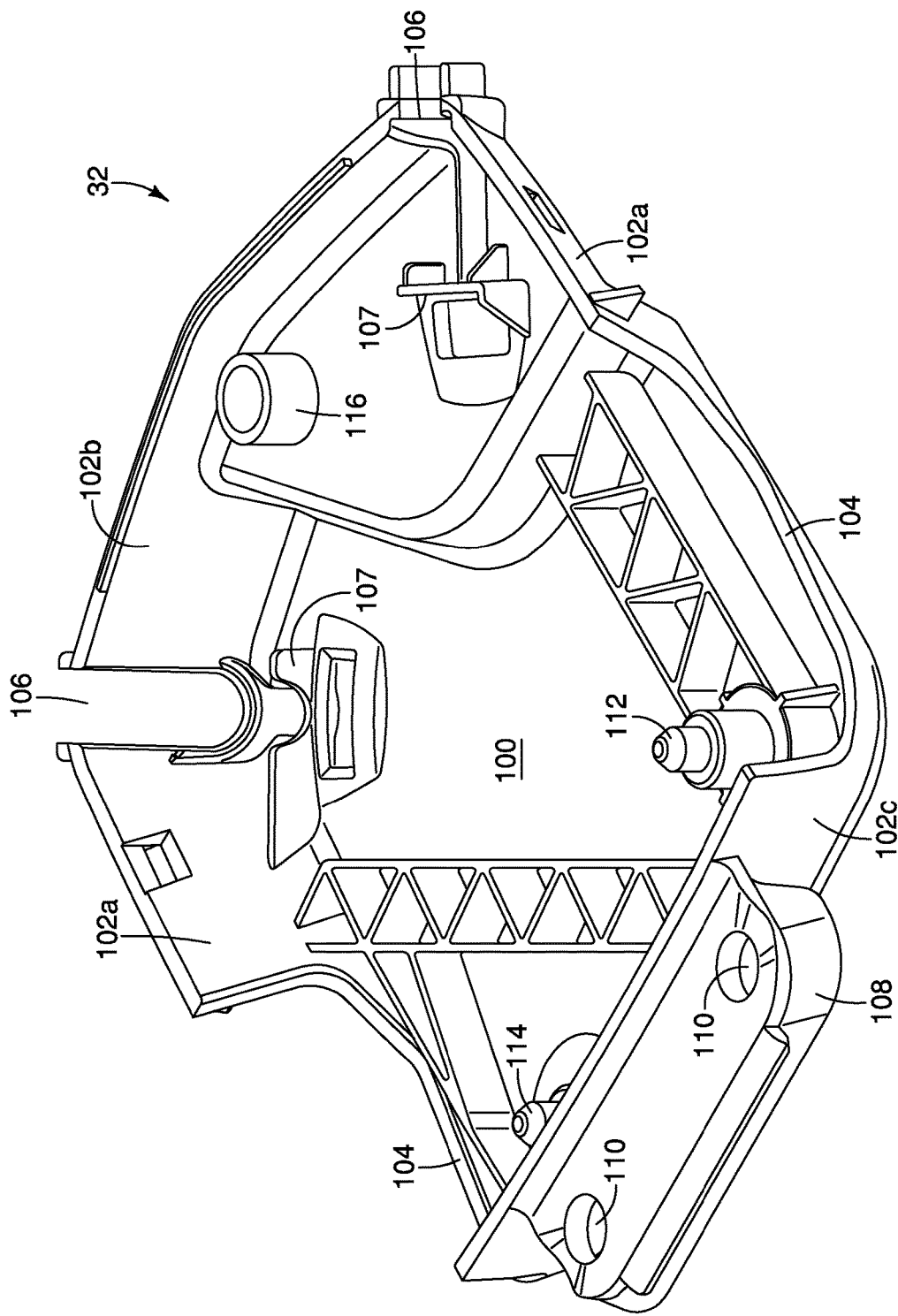
FIG. 9A is a perspective view of an embodiment of a lower housing.
Figure 9B:
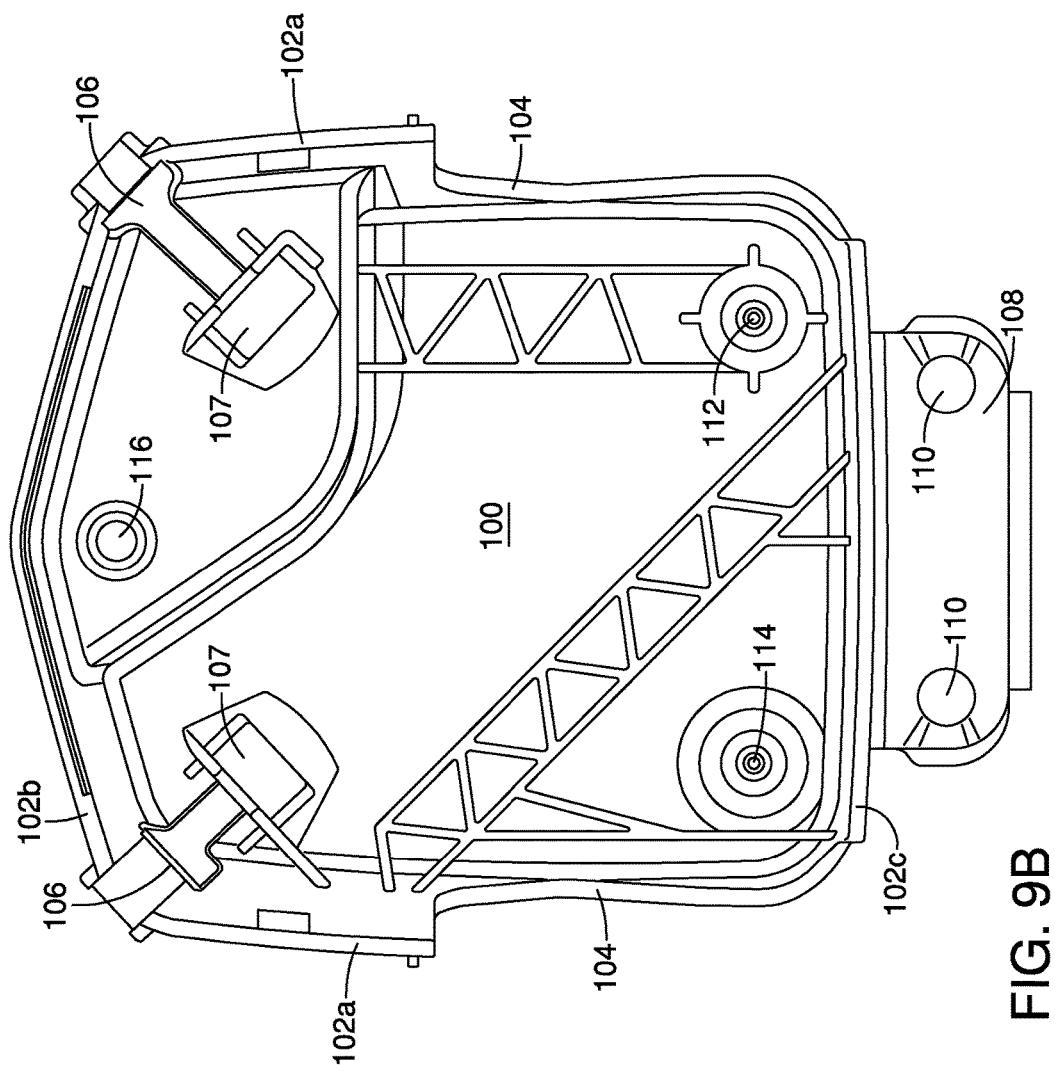
FIG. 9B is a plan view of the lower housing of FIG. 9A.

In the exemplary embodiment shown in FIGS. 9A-9B, the lower housing 32 is formed as a general bowl-shaped member. The lower housing 32 includes a lower wall 100 and a plurality of side walls 102 extending upwardly from the lower wall 100 at a substantially perpendicular orientation. Each of the lateral side walls 102a includes a lever cut-out 104 formed therein, wherein the first and second levers 38, 40 extend laterally outwardly from the casing 31 through a corresponding lever cut-out 104. A cable cut-out 106 is formed at each of the corners in which the lateral side walls 102a intersect with the front side wall 102b of the lower housing 32. The first and second connectors 47, 49 exit the casing 31 through the cable cut-outs 106. A pair of sheath holders 107 extend upwardly from the lower wall 100. The sheath holders 107 are configured to secure the sheath of the Bowden cable of the first and second connectors 47, 49, wherein the sheath remains attached to the casing 31 and the cable within the sheath is pulled through the sheath in response to actuation of the corresponding first or second lever 38, 40 to which it is attached.

As shown in FIGS. 9A-9B, a handle connector 108 extends rearwardly from the rear side wall 102c. The handle connector 108 is positioned below a portion of the cross bar 26 of the handle assembly 22, as shown in FIG. 3, for connecting the casing 31 to the cross bar 26. The handle connector 108 includes a plurality of connecting apertures 110 that receive the attachment mechanisms 34 during attachment of the lower housing 32 to the cross bar 26 and the upper housing 30.

A plurality of attachment mechanisms extend upwardly from the lower wall 100 of the lower housing 32, wherein these attachment mechanisms cooperate with corresponding attachment mechanisms extending from the upper housing 30 for attaching the upper and lower housings 30, 32. The first attachment mechanism 112 and the second attachment mechanism 114 are positioned adjacent to the opposing corners in which the lateral side walls 102a intersect with the rear side wall 102c. The first and second attachment mechanisms 112, 114 are formed as pins or protrusions that extend upwardly from the lower wall 100 of the lower housing 32. The first attachment mechanism 112 is received within the first connecting boss 50 of the first lever 38, and the second attachment mechanism 114 is received within the second connecting boss 70 of the second lever 40, as shown in FIGS. 6B, 7B, and 8B. The third attachment mechanism 116 extends upwardly from the lower wall 100, and the third attachment mechanism 116 is positioned centrally adjacent to the front side wall 102b of the lower housing 32. The third attachment mechanism 116 is formed as a cylindrical boss.

Figure 10A:
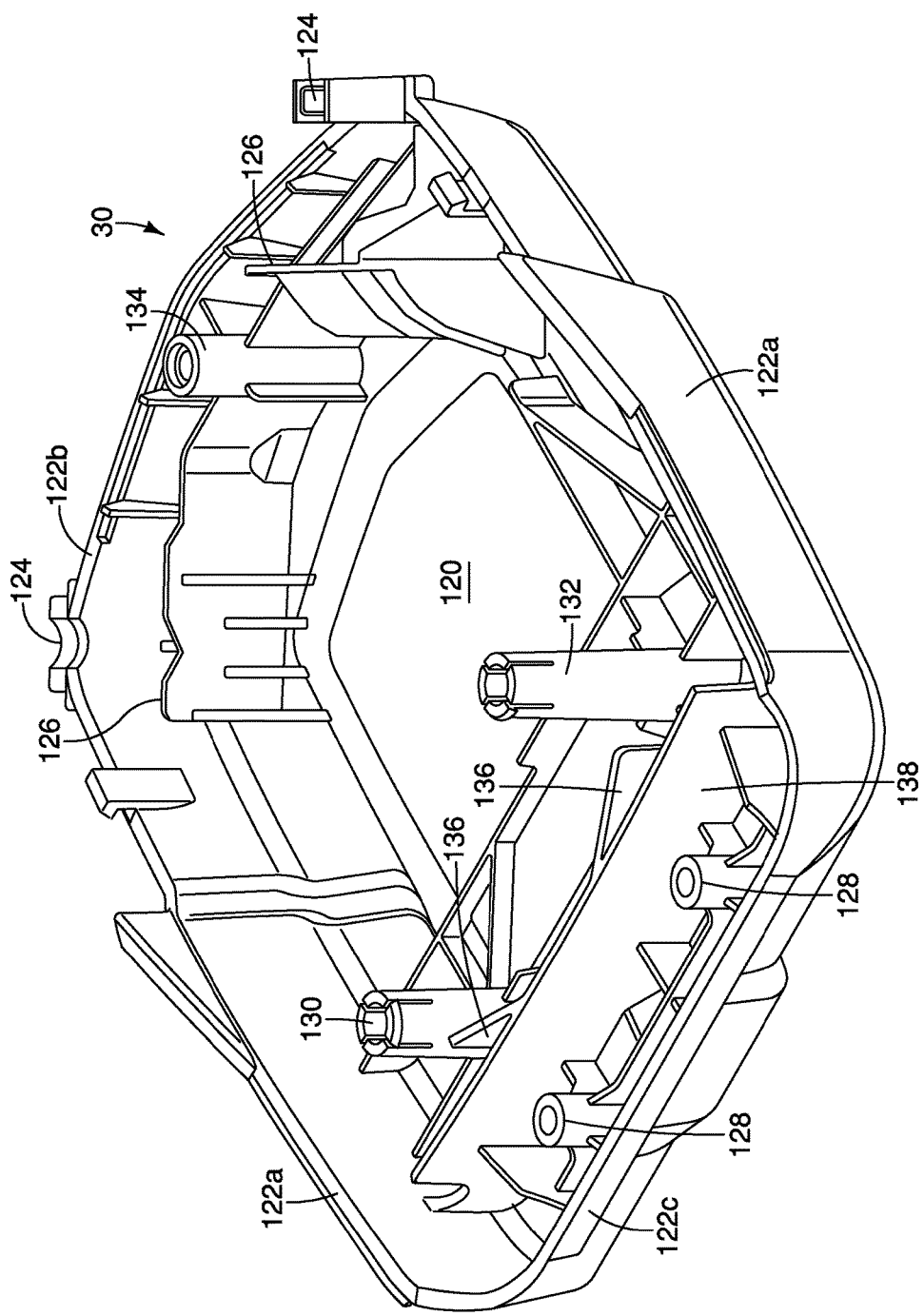
FIG. 10A is a perspective view of an embodiment of an upper housing.
Figure 10B:
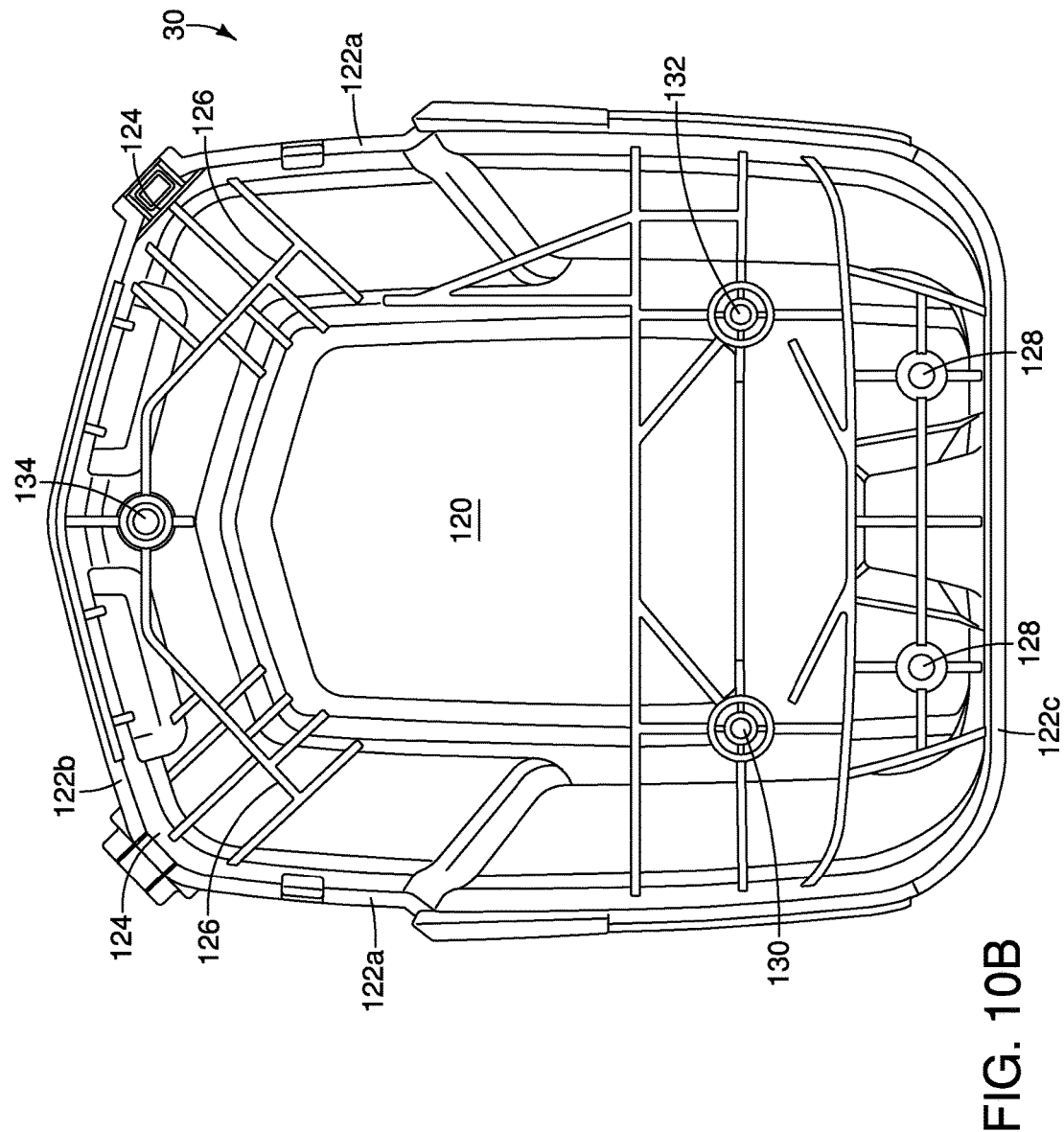
FIG. 10B is a plan view of the upper housing of FIG. 10A.

An exemplary embodiment of an upper housing 30 is shown in FIGS. 10A-10B, wherein the upper housing 30 is a bowl-shaped member. The upper housing 30 includes an upper wall 120 and a plurality of connected side walls 122 extending from the upper wall 120 in a generally perpendicular manner. At each of the corners where the lateral side walls 122a intersect with the front side wall 122b, a cable cut-out 124 is formed. The cable cut-out 124 is configured to allow the first and second connectors 47, 49 to extend through the casing 31. A pair of sheath holders 126 extend downwardly from the upper wall 120, wherein the sheath holders 126 of the upper housing 30 cooperate with the sheath holders 107 of the lower housing 32 to secure the sheath of each of the first and second connectors 47, 49 when they are formed as Bowden cables.

In an embodiment of the upper housing 30, shown in FIGS. 10A-10B, a pair of securing bosses 128 positioned adjacent to the rear side wall 122c. The securing bosses 128 upper housing 30 cooperate with the connecting apertures 110 of the lower housing 32 to secure the upper and lower housings 30, 32 together as well as secure the casing 31 of the control assembly 12 to the cross bar 26 of the handle assembly 22. In an embodiment, at least a portion of each of the securing bosses 128 is received within a corresponding aperture formed in the cross bar 26. The attachment mechanisms 34 (FIG. 3) extend through the connecting apertures 110, the cross bar 26, and the securing bosses 128 to connect the upper and lower housings 30, 32 together as well as connect the casing 31 to the cross bar 26.

In the embodiment of the upper housing 30 shown in FIGS. 10A-10B, a first attachment mechanism 130, a second attachment mechanism 132, and a third attachment mechanism 134 extend from the upper wall 120. The first and second attachment mechanisms 130, 132 are positioned adjacent to the securing bosses 128 near the rear of the upper housing 30, and the third attachment mechanism 134 is positioned centrally adjacent to the front side wall 122b. Each of the first, second, and third attachment mechanisms 130, 132, 134 is formed at a cylindrical protrusion extending from the upper wall 120. The first and second attachment mechanisms 130, 132 of the upper housing 30 cooperate with and are operatively connected to the first and second attachment mechanisms 112, 114 of the lower housing 32, wherein the connected first attachment mechanisms 112, 130 are received within the first connecting boss 50 of the first lever 38 and the connected second attachment mechanisms 114, 132 are received within the second connecting boss 70 of the second lever 40. The overall shape of the first attachment mechanisms 112, 130 and the second attachment mechanisms 114, 132 are round, thereby allowing the first and second levers 38, 40 to be able to rotate relative to the attachment mechanisms. The attachment portion of the first and second levers 38—more particularly, the first and second connecting bosses 50, 70—are rotatably connected to the attachment mechanisms extending from the upper and lower housing 30, 32 and are sandwiched between the upper and lower housings 30, 32. The third attachment mechanism 134 of the upper housing 30 is operatively connected to the corresponding third attachment mechanism 116 of the lower housing 32 to provide another attachment between the upper and lower housings 30, 32.

In an embodiment, the upper housing 30 further includes a pair of springs 136 extending at an angle to a barrier wall 138 that extends downwardly from the upper wall 120. The springs 136 are integrally formed with the barrier wall 138 and extend linearly in a cantilevered manner from the barrier wall 138. The springs 136 extend in opposing lateral directions from the barrier wall 138, and the springs 136 are flexible members capable of deflecting relative to the location at which the springs 136 extend from the barrier wall 138. The springs 136 are configured to contact and generate a biasing force against the first biased member 62 and the second biased member 82 when either/both of the springs 136 are deflected in response to actuation of the first and/or second levers 38, 40. For example, when the first lever 38 is actuated from the first operative position (FIG. 2A) toward the second operative position (FIG. 8A), the first biased member 62 rotates with the first lever 38 until it contacts the corresponding spring 136. As the first lever 38 continues to be actuated to the second operative position, the first biased member 62 continues to rotate about to the first longitudinal axis 53 and such continued rotation of the first biased member 62 causes the corresponding spring 136 to deflect toward the barrier wall 138. As the spring 136 deflects, a biasing force from the spring 136 is applied to the first biased member 62 to counter the rotation toward the second operative position. If the operator releases the first lever 38 before it is fully actuated to the second operative position, the biasing force from the spring 136 causes the first lever 38 to be rotated back to the first operative position. This movement is the same for the second biased member 82 of the second lever 40 and the biasing relationship with the corresponding spring 136.

In operation, the control assembly 12 is configured to allow an operator to selectively actuate transmissions to provide self-propelled power to the wheels of the lawn mower 10. This self-propelled power can include a front-wheel-drive operation in which the front wheels 18 are rotated or otherwise driven through an operative connection to the output shaft of the power source 14, a rear-wheel-drive operation in which the rear wheels 20 are rotated or otherwise driven through an operative connection to the output shaft of the power source 14, or an all-wheel-drive operation in which both the front and rear wheels 18, 20 are rotated or otherwise driven. The control assembly 12 further includes a no-wheel-drive mode in which neither the front or rear wheels 18, 20 being rotated or otherwise driven. The control assembly 12 includes the first and second levers 38, 40 that are independently and selectively rotatable in order to switch between each of the drive modes.

As shown in FIGS. 2A-2B, the first and second levers 38, 40 are both located in the first operative position, wherein the first and second levers 38, 40 are rotated to the furthest point away from the cross bar 26. When both the first and second levers 38, 40 are located in the first operative position, the front and rear transmissions 200, 210 are in a no-wheel-drive mode such that both the front and rear transmissions 200, 210 are in a disengaged state.

As shown in FIGS. 6A-6B, the first and second levers 38, 40 are both located in the second operative position, wherein the first and second levers 38, 40 have been rotated to a position immediately adjacent to, or abutting, the cross bar 26 of the handle assembly 22. When both the first and second levers 38, 40 are located in the second operative position, the control assembly is in the all-wheel drive mode in which the front and rear transmissions 200, 210 are in an engaged state and are driving the front and rear wheels 18, 20. As the first lever 38 is rotated to the second operative position, the first cable boss 64 pulls on the cable within the sheath of the first connector 47, wherein such actuation of the first connector 47 by the first lever 38 causes the front transmission 200 to switch from a disengaged state to an engaged state, as will be described in more detail below. Switching the front transmission 200 from the disengaged state to an engaged state causes the front transmission 200 to provide rotational power to the front wheels 18. In a similar manner, as the second lever 40 is rotated to the second operative position, the second cable boss 84 pulls on the cable within the sheath of the second connector 49, wherein such actuation of the second connector 49 by the second lever 40 causes the rear transmission 210 to switch from a disengaged state to an engaged state. Switching the rear transmission 210 from the disengaged state to an engaged state causes the rear transmission 210 to provide rotational power to the rear wheels 20, as will be described in more detail below. The above description regarding the switching each of the front and rear transmissions 200, 210 between a disengaged state to the engaged state assumes that the control assembly 12 was previously in a no-wheel-drive mode (FIGS. 2A-2B). In other operations, the control assembly 12 can switch the transmissions from either a front-wheel-drive mode (FIGS. 8A-8B) or a rear-wheel drive mode (FIGS. 7A-7B) to the all-wheel drive mode (FIGS. 6A-6B) by actuating the other of the first or second levers 38, 40 that is not already in the second operative position to the second operative position.

When the control assembly 12 has been switched to the all-wheel drive mode, as shown in FIGS. 6A-6B, the rotation of both the first and second levers 38, 40 causes the first and second levers 38, 40 to become releasably attached to each other. Such a connection between the first and second levers 38, 40 is only accomplished when both the first and second levers 38, 40 are both fully rotated to the second operative position. For example, when the control assembly 12 is switched from a front-wheel-drive mode (FIGS. 8A-8B) to the all-wheel drive mode (FIGS. 6A-6B), the first lever 38 has already been positioned in the second operative position. As the second lever 40 is rotated toward the second operative position, the second positioning boss 83 is rotated to a position in which the second positioning boss 83 engages the first spring latch 42 of the first lever 38. Simultaneously, as the second lever 40 is rotated toward the second operative position, the second spring latch 44 on the second lever 40 engages the first positioning boss 63 of the first lever 38 (FIG. 6B). It should be understood by one having ordinary skill in the art that similar operation and engagement of the first and second spring latches 42, 44 with the first and second positioning bosses 63, 83 also occurs when the control assembly 12 is switched from a rear-wheel-drive mode (FIGS. 7A-7B) to the all-wheel-drive mode (FIGS. 6A-6B).

Once both the first and second levers 38, 40 have been rotated to the second operative position, the first spring latch 42 (of the first lever 38) is engaged with the second positioning boss 83 (of the second lever 40) and the second spring latch 44 (of the second lever 40) is engaged with the first positioning boss 63 (of the first lever 38). The first and second spring latches 42, 44 provide a biasing force when the corresponding first and second positioning bosses 63, 83 come into contact with them. Once the biasing force of the spring latches is overcome, the first and second spring latches 42, 44 engage the first and second positioning bosses 63, 83 and the first and second levers 38, 40 snap into selective engagement such that the first and second spring latches 42, 44 prevent the disengagement of the first and second levers 38, 40 unless the operator physically moves one of the first or second levers 38, 40 away from its second operative position. After the control assembly 12 has been switched to the all-wheel-drive mode in which the first and second spring latches 42, 44 positively attach the first and second levers 38, 40 together, the operator only needs to hold one of the first or second levers 38, 40 in the second operative position in order to maintain the control assembly in the all-wheel-drive mode. The engagement of the first and second spring latches 42, 44 with the other lever prevents the lever not being grasped by the operator from being biased to away from the second operative position. Thus, the control assembly 12 can be maintained in an all-wheel-drive mode by maintaining continuous actuation of, or grasping, only one of the first or second levers 38, 40.

Figure 7A:
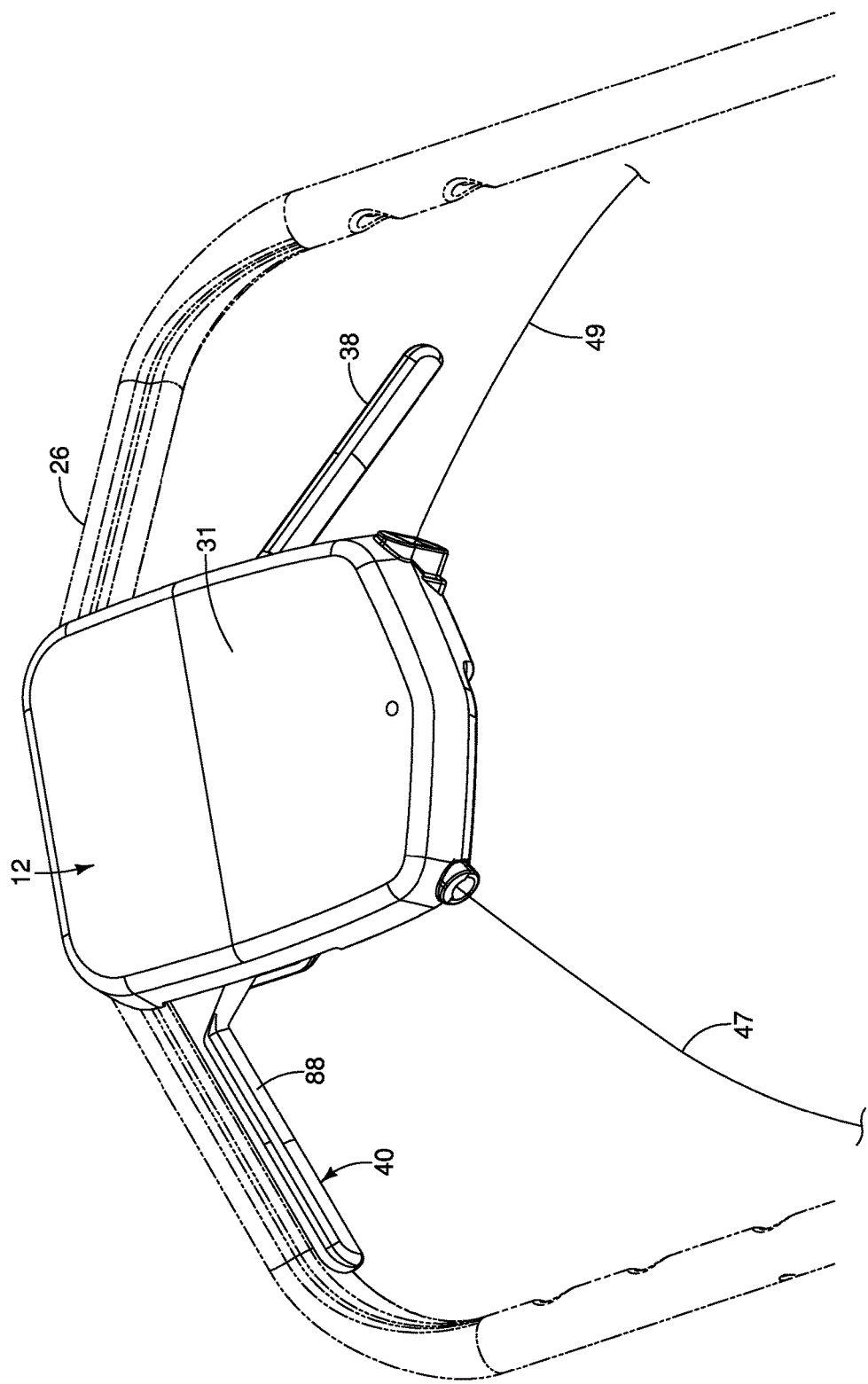
FIG. 7A is a top perspective view of a control assembly in a rear-wheel-drive mode.
Figure 7B:
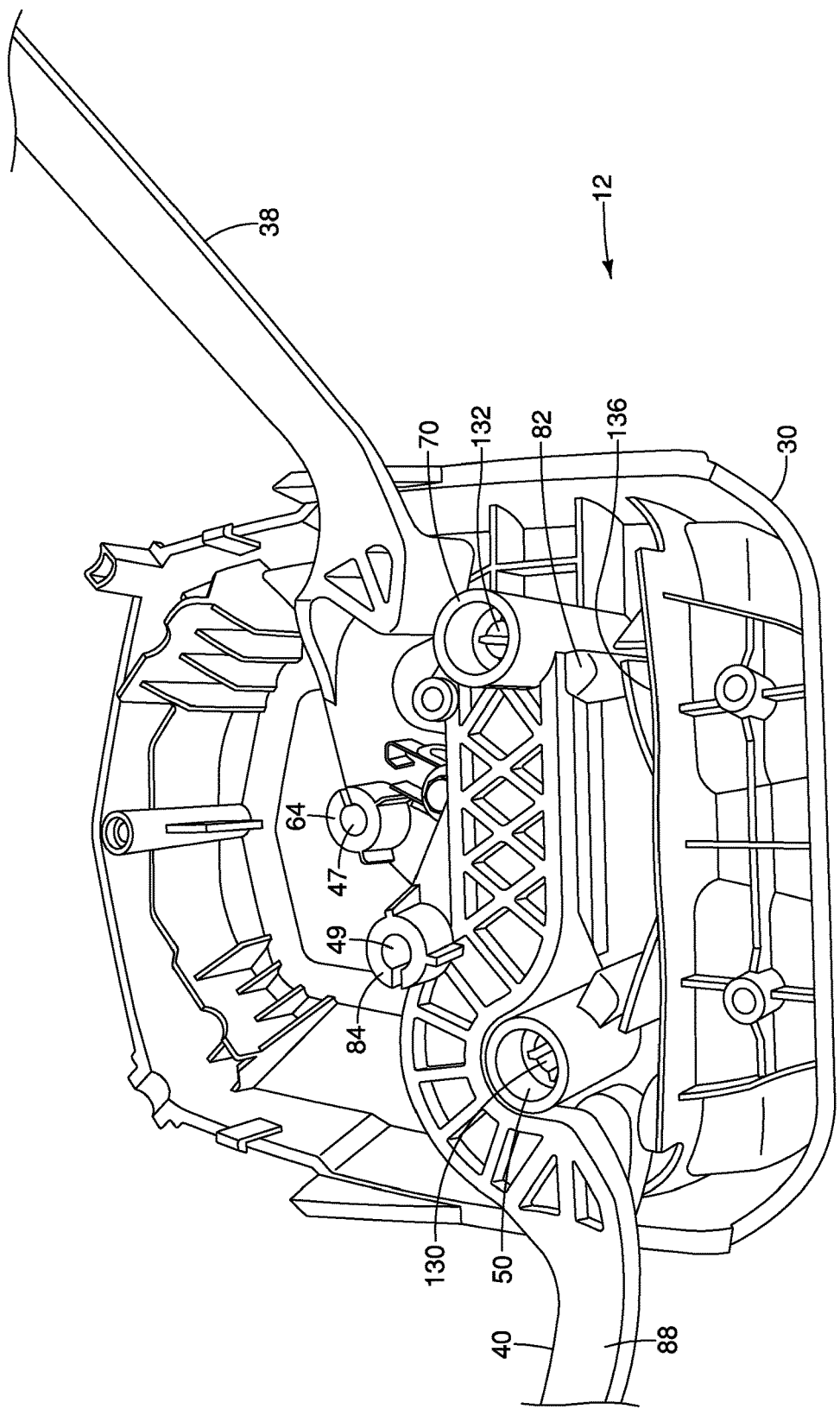
FIG. 7B is a cut-away view of the control assembly in an rear-wheel-drive mode, as shown in FIG. 7A.

The rear-wheel-drive mode of the control assembly 12 is shown in FIGS. 7A-7B. In the rear-wheel-drive mode, the second lever 40 is actuated from a first operative position to a second operative position, the first operative position of the second lever 40 being shown in FIGS. 2A-2B. In the second operative position, the second lever 40 is positioned immediately adjacent to, or abutting, the cross bar 26 of the handle assembly 22. When the second lever 40 is actuated to the second operative position, the operator grasps the second grip portion 88 and physically pulls the second grip portion 88 toward the cross bar 26. As the second lever 40 is rotated toward the second operative position, the second lever 40 rotates about the second longitudinal axis 73 defined by the second connecting boss 70. During rotation of the second lever 40, the second biased member 82 contacts a corresponding spring 136 integrally formed with the upper housing 30, and the spring 136 provides a biasing force against the rotation of the second lever 40 toward the second operative position. Also, rotation of the second lever 40 toward the second operative position causes the second cable boss 84 to move with the second central portion 74 about the second longitudinal axis 73. This movement of the second cable boss 84 pulls on, or actuates, the cable portion of the second connector 49 that is attached to the second cable boss 84. Actuation of the second connector 49 resulting from actuation of the second lever from the first operative position to the second operative position results in switching the rear transmission 210 attached to the opposite end of the second connector 49 from a disengaged state to an engaged state. As a result, actuation of the second lever 40 from the first operative position to the second operative position switches the rear transmission 210 from a disengaged state to an engaged state, thereby placing the control assembly 12 and the lawn mower 10 in a rear-wheel drive mode.

Figure 8A:
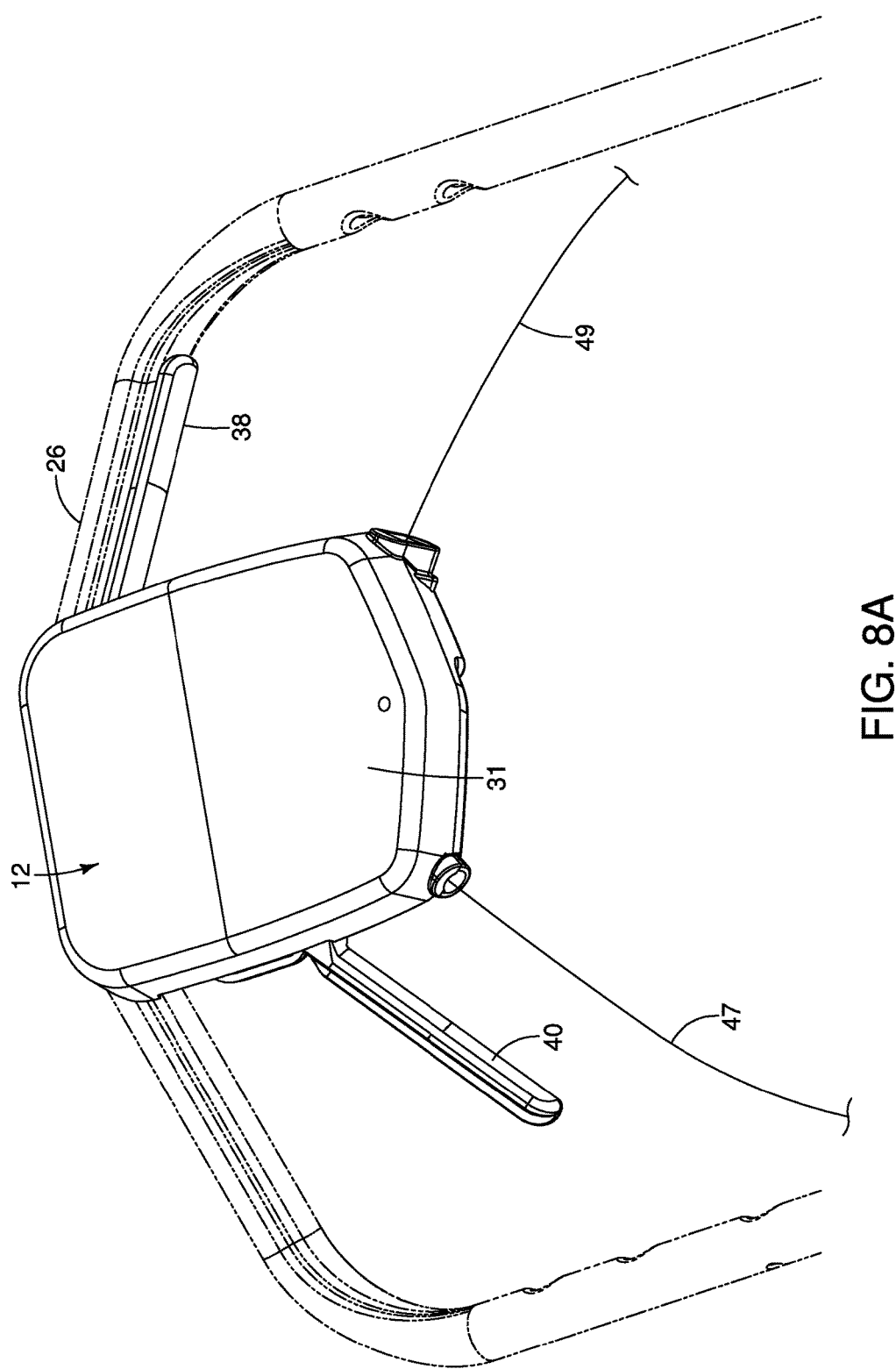
FIG. 8A is a top perspective view of a control assembly in a front-wheel-drive mode.
Figure 8B:
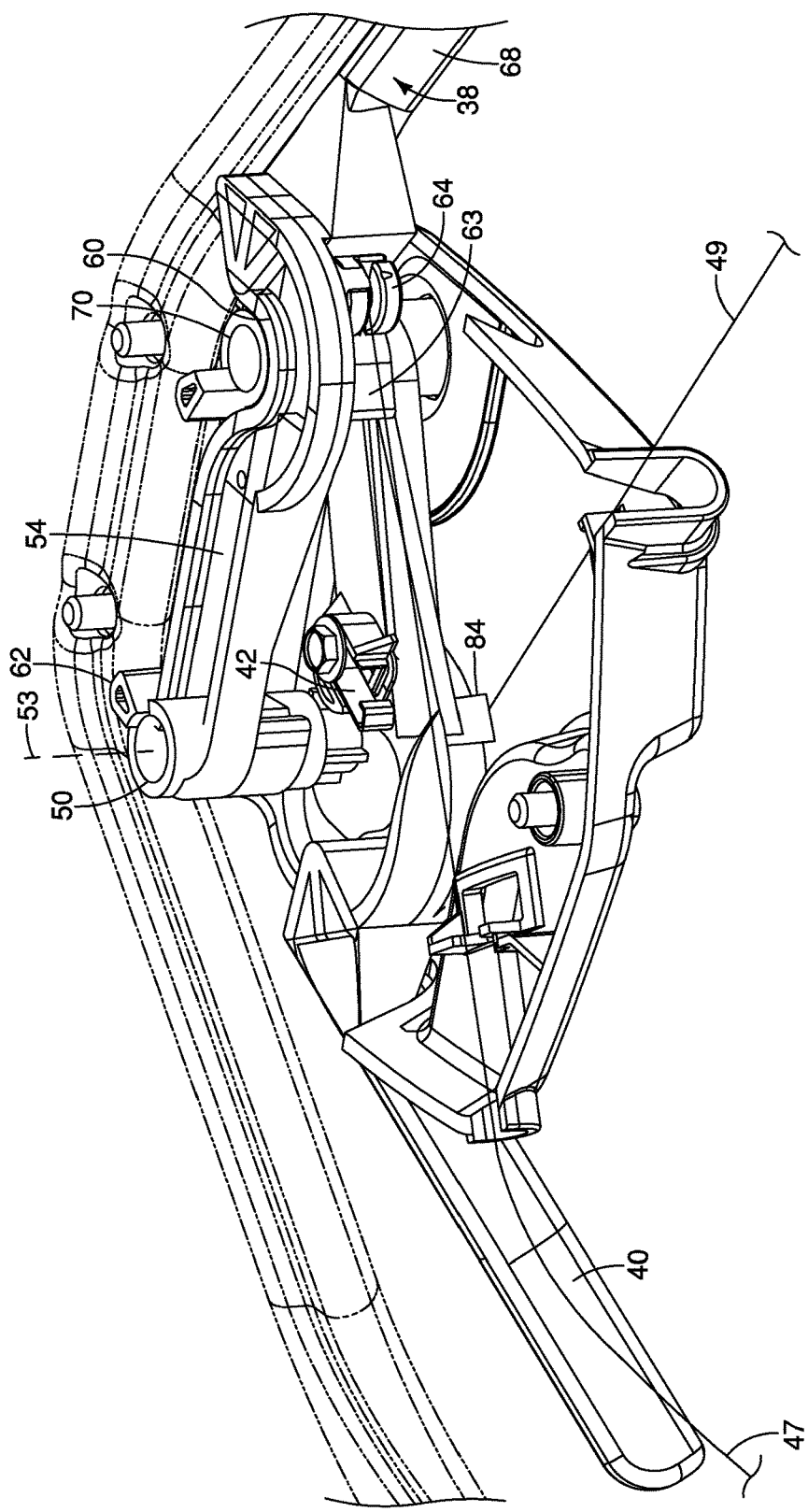
FIG. 8B is a cut-away view of the control assembly in a front-wheel-drive mode, as shown in FIG. 8A.

The front-wheel-drive mode of the control assembly 12 is shown in FIGS. 8A-8B. In the front-wheel-drive mode, the first lever 38 is actuated from a first operative position to a second operative position, the first operative position of the first lever 38 being shown in FIGS. 2A-2B. In the second operative position, the first lever 38 is positioned immediately adjacent to, or abutting, the cross bar 26 of the handle assembly 22. When the first lever 38 is actuated to the second operative position, the operator grasps the first grip portion 68 and physically pulls the first grip portion 68 toward the cross bar 26. As the first lever 38 is rotated toward the second operative position, the first lever 38 rotates about the first longitudinal axis 53 defined by the first connecting boss 50. During rotation of the first lever 38, the first biased member 62 contacts a corresponding spring 136 integrally formed with the upper housing 30, and the spring 136 provides a biasing force against the rotation of the first lever 38 toward the second operative position. Also, rotation of the first lever 38 toward the second operative position causes the first cable boss 64 to move with the first central portion 54 about the first longitudinal axis 53. This movement of the first cable boss 65 pulls on, or actuates, the cable portion of the first connector 47 that is attached to the first cable boss 64. Actuation of the first connector 47 resulting from actuation of the first lever 38 from the first operative position to the second operative position results in switching the front transmission 200 attached to the opposite end of the first connector 47 from a disengaged state to an engaged state. As a result, actuation of the first lever 38 from the first operative position to the second operative position switches the front transmission 200 from a disengaged state to an engaged state, thereby placing the control assembly 12 and the lawn mower 10 in a front-wheel drive mode.

Figure 11:
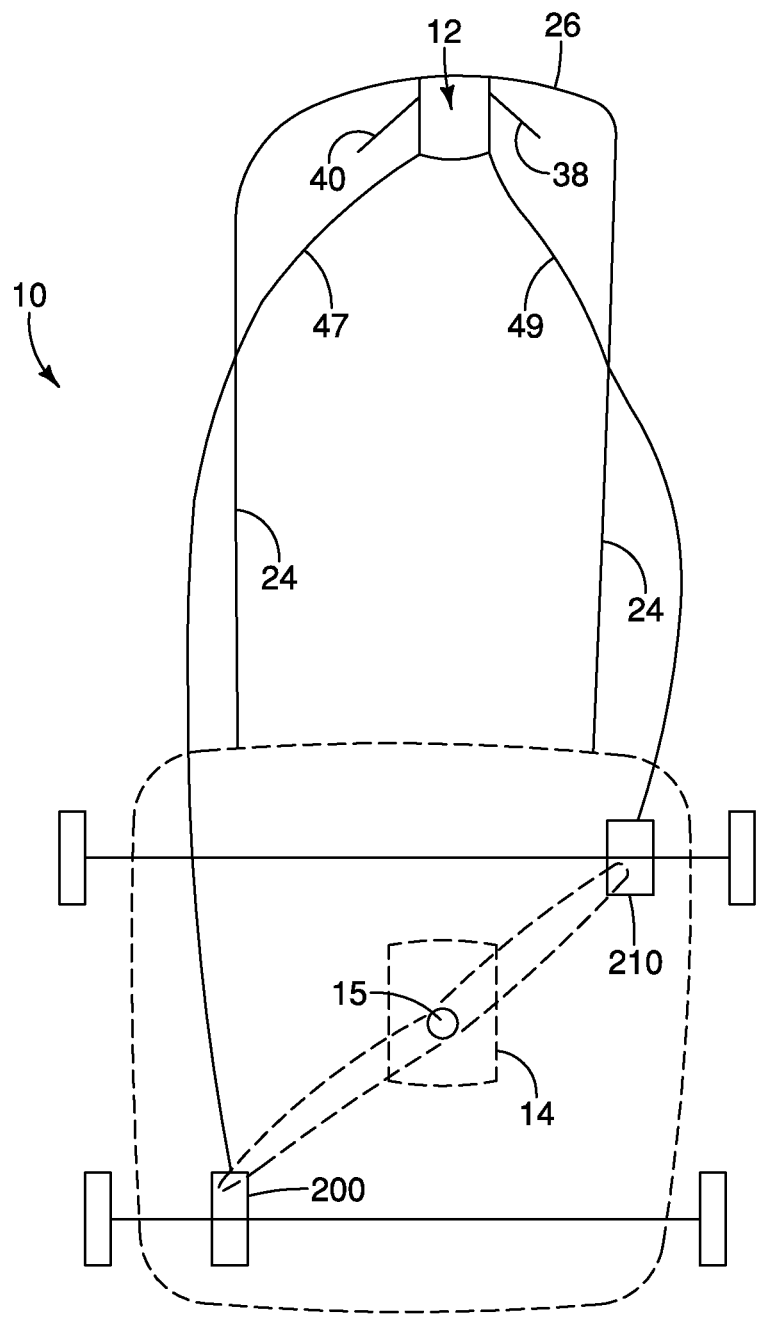
FIG. 11 is a schematic diagram of the connections between the control assembly and the front and rear transmissions.
Figure 12:
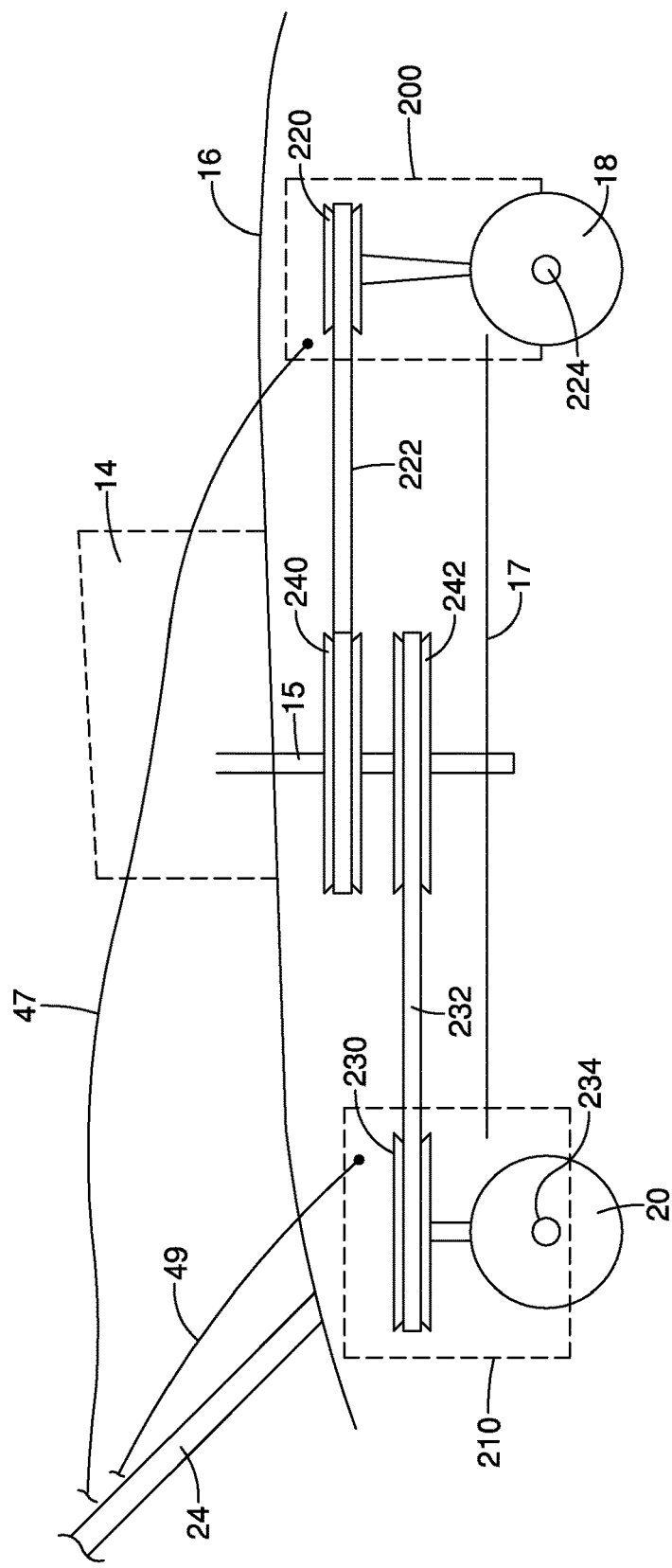
FIG. 12 is a schematic diagram of the connections between the front and rear transmissions with the power source and the front and rear wheels.

FIGS. 11-12 illustrate an exemplary embodiment of a schematic diagram of the control assembly 12 and the manner in which it is connected to the front and rear transmissions 200, 210 and the operation of these transmissions in response to the control assembly 12 switching between the different drive modes. In an embodiment, the front and rear transmissions 200, 210 are formed as tip-type transmissions, wherein each transmission is independently and separately biased into a disengaged state and switching the transmission from the disengaged state to the engaged state involves physically tipping the transmission in order to tighten the transfer belt that operatively connects the transmission to the power source.

As shown in FIG. 12, the front transmission 200 includes a first pulley 220 operatively connected to the front axle 224 on which the front wheels 18 are attached. The front transmission 200 is operatively connected to the front axle 224 such that rotation of the first pulley 220 of the front transmission 200 causes the front axle 224 to rotate, thereby providing self-propulsion to the front wheels 18. The rear transmission 210 includes a second pulley 230 operatively connected to the rear axle 234 on which the rear wheels 20 are attached. The rear transmission 210 is operatively connected to the rear axle 234 such that rotation of the second pulley 230 of the rear transmission 210 causes the rear axle 234 to rotate, thereby providing self-propulsion to the rear wheels 20. The power source 14 includes a rotatable crankshaft 15 or spindle extending downwardly through the deck 16 for rotating the cutting blade 17. In an embodiment, two separate pulleys—a third pulley 240 and a fourth pulley 242—are fixedly attached to the crankshaft 15. In another embodiment, the third and fourth pulleys 242 form a single integrated dual-pulley. The front transmission 200 is operatively connected to the power source 14 by way of a first transfer belt 222 extending between the first pulley 220 of the front transmission 200 and the third pulley 240 attached to the crankshaft 15. The rear transmission 210 is operatively connected to the power source 14 by way of a second transfer belt 232 extending between the second pulley 230 of the rear transmission 210 and the fourth pulley 242 attached to the crankshaft 15. When each of the front and rear transmissions 200, 210 is in a disengaged state, the transmission is tilted to a position in which the corresponding first or second transfer belt 222, 232 has enough slack that rotation of the crankshaft 15 is not transferred to the front and rear transmissions 200, 210.

When the front transmission 200 is switched to the engaged state, the front transmission 200 is tilted such that the slack in first transfer belt 222 is significantly reduced or eliminated such that the first transfer belt 222 is taught enough wherein rotation of the crankshaft 15 is transferred to the first pulley 220 so as to rotate the first pulley 220. Rotation of the first pulley 220 then causes the front axle 224 and the front wheels 18 to rotate. When the rear transmission 210 is switched to the engaged state, the rear transmission 210 is tilted such that the slack in second transfer belt 232 is significantly reduced or eliminated such that the second transfer belt 232 is taught enough wherein rotation of the crankshaft 15 is transferred to the second pulley 230 so as to rotate the second pulley 230. Rotation of the second pulley 230 then causes the rear axle 234 and the rear wheels 20 to rotate.

In the illustrated embodiment shown in FIGS. 11-12, the first lever 38 is operatively connected to the front transmission 200 by way of the first connector 47, and the second lever 40 is operatively connected to the rear transmission 210 by way of the second connector 49. Actuation of the first lever 38 from the first operative position to the second operative position results in the actuation of the first connector 47, wherein actuation of the first connector 47 (the pulling on the cable within the Bowden cable) causes the front transmission 200 to tilt and switch from the disengaged state to the engaged state. Switching the front transmission 200 to the engaged state results in a front-wheel-drive mode. Actuation of the second lever 40 from the first operative position to the second operative position results in the actuation of the second connector 49, wherein actuation of the second connector 49 (the pulling on the cable within the Bowden cable) causes the rear transmission 210 to tilt and switch from the disengaged state to the engaged state. Switching the rear transmission 210 to the engaged state results in a rear-wheel-drive mode. Actuation of both the first and second levers 38, 40 together from their first operative position to their second operative position results in the actuation of the first and second connectors 47, 49, wherein actuation of the first and second connectors 47, 49 (the pulling on the cable within the Bowden cable) causes the front and rear transmissions 200, 210 to tilt and be switch from the disengaged state to the engaged state. Switching the front and rear transmissions 200, 210 to the engaged state results in an all-wheel-drive mode. It should be understood by one having ordinary skill in the art that switching the front and/or rear transmissions 200, 210 from the engaged state to the disengaged state can be accomplished by releasing the corresponding first and/or second lever 38, 40 to allow the first and/or second lever 38, 40 to return to their first operative position.

While preferred embodiments of the present invention have been described, it should be understood that the present invention is not so limited and modifications may be made without departing from the present invention. The scope of the present invention is defined by the appended claims, and all devices, process, and methods that come within the meaning of the claims, either literally or by equivalence, are intended to be embraced therein.

What is claimed is:

1. A control assembly for controlling a drive mode of a walk-behind lawn mower, said control assembly comprising:

a casing attached to a handle assembly;
a first lever operatively connected to said casing and extending from a lateral side of said casing, said first lever being rotatable between a first operative position and a second operative position relative to said casing, and said first lever includes a first positioning boss;
a second lever operatively connected to said casing and extending from an opposing lateral side of said casing than said first lever, said second lever being rotatable between a first operative position and a second operative position relative to said casing, and said second lever includes a second positioning boss;
a first spring latch attached to said first lever, wherein said first spring latch selectively receives said second positioning boss;
a second spring latch attached to said second lever, wherein said second spring latch selectively receives said first positioning boss;
a front transmission operatively connected to said first lever and a pair of front wheels, wherein rotation of said first lever from said first operative position to said second operative position causes said front transmission to be switched from a disengaged state to an engaged state, said front wheels being driven by said front transmission when said front transmission is switched from said disengaged state to said engaged state; and
a rear transmission operatively connected to said second lever and a pair of rear wheels, wherein rotation of said second lever from said first operative position to said second operative position causes said rear transmission to be switched from a disengaged state to an engaged state, said rear wheels being driven by said rear transmission when said rear transmission is switched from said disengaged state to said engaged state;
wherein actuation of both said first lever and said second lever from said first operative position to said second operative position produces an all-wheel-drive mode in which said front wheels are driven by said front transmission and said rear wheels are driven by said rear transmission; and
wherein said all-wheel-drive mode is maintained by continuously actuating only one of said first lever or said second lever in said second operative position.

2. The control assembly of claim 1, wherein said first spring latch receives said second positioning boss and said second spring latch receives said first positioning boss when said first lever and said second lever are both positioned in said second operative position.

3. The control assembly of claim 2, wherein when said first and second levers are both in said second operative position, said first and second levers are disconnected from each other by actuation of at least one of said levers by an operator.

4. The control assembly of claim 1, wherein both of said first lever and said second lever are biased toward said first operative position.

5. The control assembly of claim 1, wherein said second operative position of both said first lever and said second lever is positioned immediately adjacent to said handle assembly.

6. The control assembly of claim 1, wherein said first and second levers are selectively positionable in order to provide a no-wheel-drive mode, a front-wheel-drive mode, a rear-wheel-drive mode, and an all-wheel-drive mode.

7. A control assembly for controlling a drive mode of a walk-behind lawn mower, said control assembly comprising:

a casing attached to a handle assembly, said casing formed of an upper housing and a lower housing;

a first lever operatively connected to said casing and extending outwardly from a lateral side of said casing, said first lever being rotatable between a first operative position and a second operative position relative to said casing, and said first lever includes a first positioning boss;

a second lever operatively connected to said casing and extending outwardly from an opposing lateral side of said casing than said first lever, said second lever being rotatable between a first operative position and a second operative position relative to said casing, and said second lever includes a second positioning boss;

a first spring latch attached to said first lever, wherein said first spring latch selectively receives said second positioning boss;

a second spring latch attached to said second lever, wherein said second spring latch selectively receives said first positioning boss;

a plurality of transmissions operatively connected to said first and second levers, said plurality of transmissions being operatively connected to said front wheels and said rear wheels;

wherein actuation of both said first lever and said second lever from said first operative position to said second operative position produces an all-wheel-drive mode in which said front wheels and rear wheels are driven by at least two of said transmissions.

8. The control assembly of claim 7, wherein when said first and second levers are both in said second operative position, said first and second levers are disconnected from each other by actuation of at least one of said levers by an operator toward said first operative position.

9. The control assembly of claim 7, wherein both of said first lever and said second lever are biased toward said first operative position.

10. The control assembly of claim 7, wherein said second operative position of both said first lever and said second lever is positioned immediately adjacent to said handle assembly.

11. The control assembly of claim 7, wherein said first and second levers are selectively positionable in order to provide a no-wheel-drive mode, a front-wheel-drive mode, a rear-wheel-drive mode, and an all-wheel-drive mode.

12. A method for controlling a drive mode of a walk-behind lawn mower having a deck and a handle assembly extending from said deck, said control assembly comprising:

providing a casing attached to said handle assembly, said casing formed of an upper housing and a lower housing;

providing a pair of levers operatively connected to said casing, wherein said levers extend in opposite directions from said casing and said levers are rotatable relative to said casing between a first operative position and a second operative position, and each of said levers includes a positioning boss;

providing a spring latch attached to each of said pair of levers, wherein said spring latches selectively receive said positioning boss of the other lever;

providing a plurality of transmissions, each of said transmissions being operatively connected to a separate one of said levers, one of said transmissions being operatively connected to said front wheels and the other of said transmissions being operatively connected to said rear wheels;

rotating said levers between said first operative position and said second operative position to switch said transmissions between a no-wheel-drive mode, a front-wheel-drive mode, a rear-wheel-drive mode, and an all-wheel-drive mode in response to selective rotation of said first and second levers.

13. The control assembly method of claim 12, wherein rotating said first and second levers to said first operative position generates said no-wheel-drive mode.

14. The method of claim 12, wherein rotating one of said pair of levers to said second operative position causes one of said plurality of transmissions to drive said front wheels to generate a front-wheel-drive mode.

15. The method of claim 12, wherein rotating one of said pair of levers to said second operative position causes one of said plurality of transmissions to drive said rear wheels to generate a rear-wheel-drive mode.

16. The method of claim 12, wherein rotating both of said pair of levers to said second operative position causes each of said plurality of transmissions to drive both said front and rear wheels to generate an all-wheel-drive mode.

17. The method of claim 16, wherein said pair of levers are releasably connected to each other when both of said pair of levers are positioned in said second operative position.

* * * * *